US009477232B2

(12) United States Patent
Takahashi et al.

(10) Patent No.: US 9,477,232 B2
(45) Date of Patent: Oct. 25, 2016

(54) APPARATUS FOR DIVIDING AND SUPPLYING GAS AND METHOD FOR DIVIDING AND SUPPLYING GAS

(71) Applicants: FUJIKIN INCORPORATED, Osaka (JP); TOKYO ELECTRON LIMITED, Tokyo (JP)

(72) Inventors: Eiji Takahashi, Miyagi (JP); Norikazu Sasaki, Miyagi (JP); Atsushi Sawachi, Miyagi (JP); Yohei Sawada, Osaka (JP); Nobukazu Ikeda, Osaka (JP); Ryousuke Dohi, Osaka (JP); Kouji Nishino, Osaka (JP)

(73) Assignees: FUJIKIN INCORPORATED, Osaka (JP); TOKYO ELECTRON LIMITED, Tokyo (JP)

( * ) Notice: Subject to any disclaimer, the term of this patent is extended or adjusted under 35 U.S.C. 154(b) by 113 days.

(21) Appl. No.: 14/473,493

(22) Filed: Aug. 29, 2014

(65) Prior Publication Data
US 2015/0059859 A1    Mar. 5, 2015

(30) Foreign Application Priority Data

Aug. 30, 2013    (JP) .................................. 2013-179237

(51) Int. Cl.
G05D 7/06    (2006.01)
G05D 11/13    (2006.01)

(52) U.S. Cl.
CPC .......... *G05D 7/0664* (2013.01); *G05D 11/132* (2013.01); *Y10T 137/0363* (2015.04); *Y10T 137/2529* (2015.04); *Y10T 137/2562* (2015.04);

(Continued)

(58) Field of Classification Search
CPC .......... G05D 11/132; Y10T 137/2529; Y10T 137/2562; Y10T 137/2652; Y10T 137/7759; Y10T 137/776; Y10T 137/7761
USPC ............... 137/101.19, 110, 118.02, 486, 487
See application file for complete search history.

(56) References Cited

U.S. PATENT DOCUMENTS 3,272,217 A * 9/1966 Young .................. G05D 11/132
137/101.19
3,556,126 A * 1/1971 Oswald ................ G05D 7/0635
137/118.04

(Continued)

FOREIGN PATENT DOCUMENTS

JP    11-212653 A    8/1999
JP    2008-57594 A    3/2008

(Continued)

*Primary Examiner* — William McCalister
(74) *Attorney, Agent, or Firm* — Griffin and Szipl PC

(57) ABSTRACT

An apparatus for dividing and supplying gas is provided with a flow rate control device, a plurality of divided flow passages of gas flowing from the flow rate control device, thermal-type mass flow sensors disposed to the divided flow passages, electrically-operated valves disposed on a downstream side of the thermal-type mass flow sensors, controllers that control the electrically-operated valves, and a flow ratio setting calculator that calculates a total flow rate, then calculates flow rates of the divided flow passages, and then inputs the calculated flow rates as set flow rates to each controllers. One of the divided flow passages with the highest set flow rate is put in an uncontrolled state, and opening degree for each of the rest divided flow passages is controlled, and then feedback control of the divided flow rate of each of the divided flow passages is implemented by each of the controllers.

10 Claims, 16 Drawing Sheets

(52) U.S. Cl.
CPC ..... *Y10T 137/7759* (2015.04); *Y10T 137/7761* (2015.04)

(56) References Cited

U.S. PATENT DOCUMENTS

| | | | | |
|---|---|---|---|---|
| 4,107,246 | A * | 8/1978 | LaSpisa | B29C 47/70 264/40.7 |
| 4,828,219 | A * | 5/1989 | Ohmi | F16K 41/12 251/118 |
| 4,953,826 | A * | 9/1990 | Ohmi | F16K 7/16 137/550 |
| 5,329,965 | A * | 7/1994 | Gordon | G05D 7/0652 137/599.07 |
| 5,439,026 | A * | 8/1995 | Moriya | G05D 7/0635 137/486 |
| 6,333,272 | B1 * | 12/2001 | McMillin | C23F 4/00 438/710 |
| 6,752,166 | B2 * | 6/2004 | Lull | G05D 7/0635 118/715 |
| 7,353,841 | B2 * | 4/2008 | Kono | G05D 16/206 118/715 |
| 8,019,481 | B2 * | 9/2011 | Yamaguchi | G05D 7/0664 137/486 |
| 2003/0130807 | A1 * | 7/2003 | Ambrosina | G01F 1/68 702/45 |
| 2005/0109967 | A1 * | 5/2005 | Ohmi | F16K 7/14 251/127 |
| 2006/0071192 | A1 * | 4/2006 | Ohmi | F16K 7/14 251/331 |
| 2006/0237063 | A1 * | 10/2006 | Ding | G05D 11/132 137/487.5 |
| 2007/0186983 | A1 * | 8/2007 | Ding | G05D 11/132 137/487.5 |
| 2010/0269924 | A1 * | 10/2010 | Yasuda | G05D 11/132 137/488 |
| 2011/0094596 | A1 * | 4/2011 | Sugiyama | G05D 7/0664 137/14 |
| 2013/0085618 | A1 * | 4/2013 | Ding | C23C 16/45561 700/282 |
| 2013/0220433 | A1 * | 8/2013 | Sawada | G05D 7/0641 137/10 |

FOREIGN PATENT DOCUMENTS

| | | |
|---|---|---|
| JP | 2011-117473 A | 6/2011 |
| WO | 2004/114038 A1 | 12/2004 |

* cited by examiner

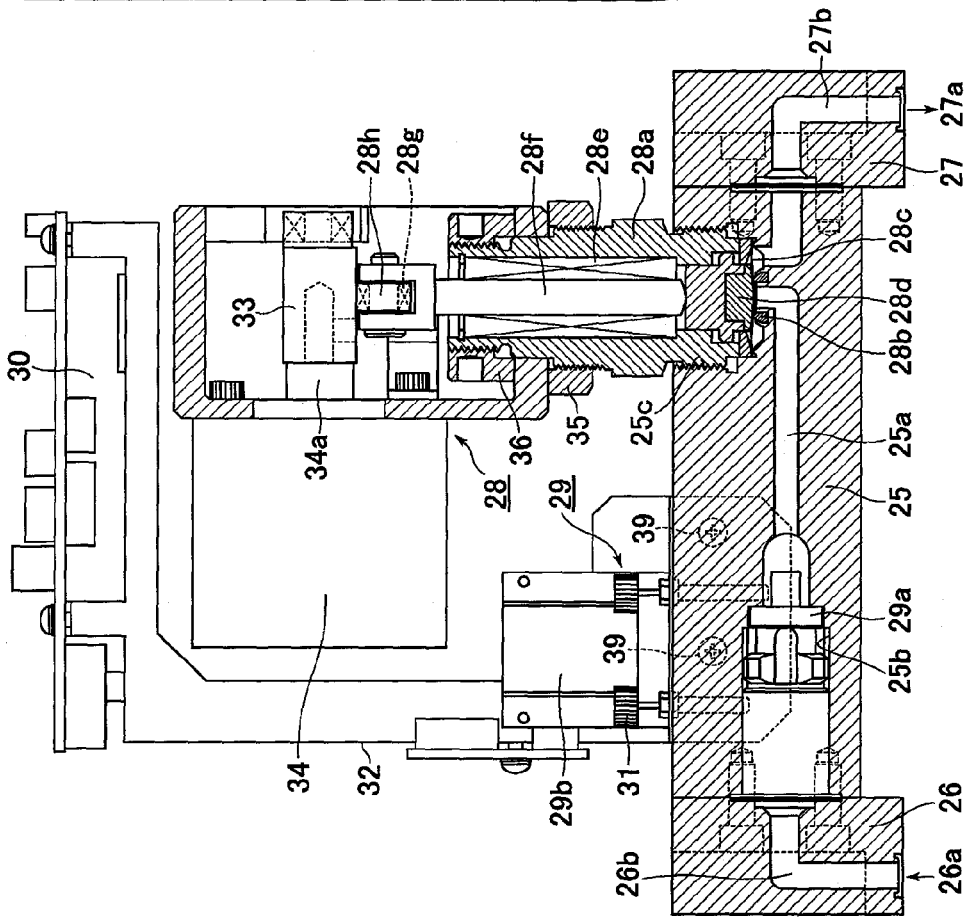
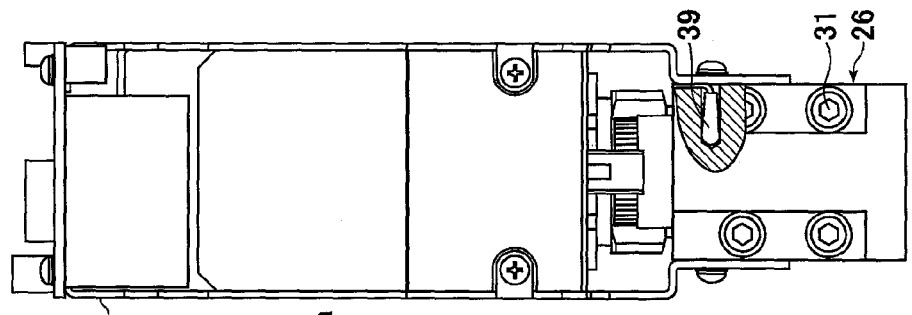
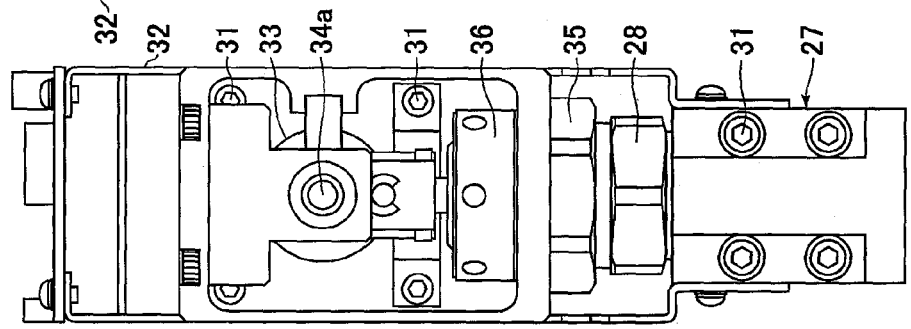
FIG.2

FIG.7
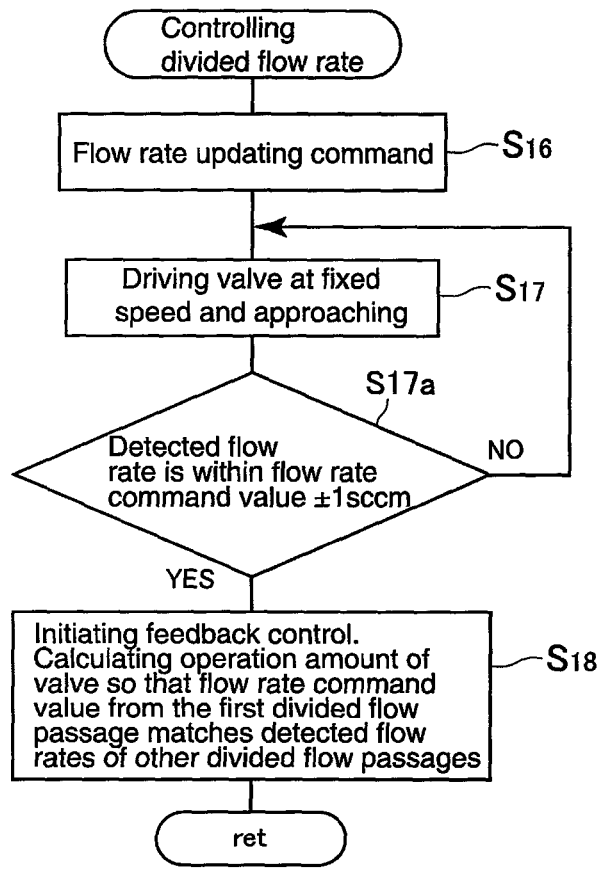
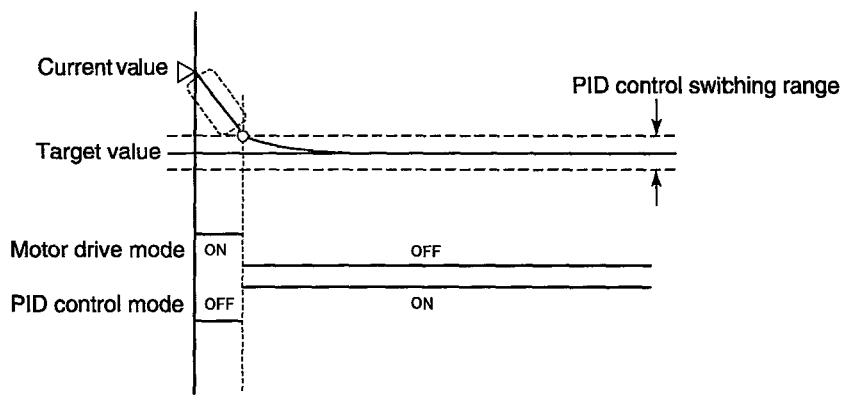

Prior Art

Prior Art

Prior Art

APPARATUS FOR DIVIDING AND SUPPLYING GAS AND METHOD FOR DIVIDING AND SUPPLYING GAS

CROSS-REFERENCE TO RELATED APPLICATIONS

This application claims priority to Japanese Patent Application No. 2013-179237 filed on Aug. 30, 2013, the entire contents of which are incorporated by reference herein.

TECHNICAL FIELD

The present invention relates to an improvement in a gas dividing and supplying system that divides and supplies gas emitted from a gas supply source based on a predetermined flow ratio to a plurality of divided gas flow passages each of which is provided with a thermal-type mass flow sensor and connected each other in parallel. More particularly, relates to an apparatus for dividing and supplying gas and a method for dividing and supplying gas that achieve simplification and miniaturization of a structure of the apparatus for dividing and supplying gas and is capable of easily and reliably preventing the occurrence of an excessive flow-in of gas (i.e., overshooting) at the beginning of supplying gas to each of the divided flow passages as well as enhancing responsiveness and accuracy of flow rate control.

BACKGROUND ART

In recent years, in the field relative to semiconductor manufacturing equipment or chemical manufacturing equipment, a gas dividing and supplying system has been employed in many cases with the enlargement of a process chamber, a reactor etc., and various types of gas dividing and supplying systems have been developed.

FIG. 12 shows an example of a conventional gas dividing/supplying apparatus that uses a thermal-type flow rate control device MFC (mass flow controller) or a pressure-type flow rate control device FCS, and gas G emitted from a gas supply source S is divided and supplied to a process chamber C and others through the thermal or pressure-type flow rate control device in the ratio of a divided flow rate $Q_1$ to a divided flow rate $Q_2$.

By the way, in the flow rate control devices that are provided to each of the divided flow passages, when gas starts to be supplied, an excessive flow-in of gas (overshooting phenomenon) is liable to easily occur in general, and especially in the thermal-type flow rate control device MFC, the occurrence of the overshooting phenomenon is inevitable.

In the thermal-type flow rate control device and a thermal-type mass flow sensor, variation of the zero point due to temperature and change in a detected flow rate caused by pressure in a flow regulating layer portion are relatively large and enhancement of flow rate control accuracy is hindered a lot.

Further, in case a gas flow rate for dividing and supplying is switched frequently, it is difficult to increase responsiveness of the divided flow rate control as it takes quite long time from when the divided flow rate control procedure including setting of a flow ratio (divided flow ratio) is started to when a stable control is established.

For example, based on results obtained by analyzing a cause of a gas overshooting phenomenon that occurs immediately after starting supply of gas by use of a gas supplying apparatus arranged as shown in FIG. 13, the present inventors have found that, in a gas supplying apparatus that uses the conventional thermal-type flow rate control device MFC, (a) most gas that causes the overshooting phenomenon is gas that stagnates in pipe passages $L_1$ to $L_3$ by which changeover valves $V_1$ to $V_3$ are connected to thermal-type flow rate control devices $MFC_1$ to $MFC_3$, respectively, and (b) the structure itself of each thermal-type flow rate control device $MFC_1$ to $MFC_3$ increases the stagnation of gas that causes the overshooting phenomenon.

In more detail, as shown in FIG. 14 that is a block diagram showing a basic structure of the conventional thermal-type flow rate control device MFC, gas flows in from the primary side is divided into gas portions flowing through a laminar flow bypass portion (flow regulating layer portion) 59 and a sensor bypass portion 60, and a mass flow rate of the gas is determined by a sensor 61 in the form of temperature change in ratio thereto, and the determined temperature change is converted into electric signals in a bridge circuit 62, and the resulting electric signals are output through an amplifier circuit 63 and others to a display 64 and to a comparison control circuit 65 as linear voltage signals. Meanwhile, set signal transmitted from outside is input from a setter 66 into the comparison control circuit 65, in which the difference between the aforementioned detected signal and the set signal is calculated, and the resulting signal difference is sent into a valve drive 67, which controllably open or close a flow rate control valve 68 in a direction in which the signal difference becomes zero. In the drawing, reference symbol 69 designates a power supplying portion.

Now, if a changeover valve $V_1$ mounted on the secondary side is suddenly closed while the thermal-type flow rate control device MFC is in operation, the gas flowing through the sensor 61 comes to a standstill, and therefore the control system of the thermal-type flow rate control device MFC works transiently to increase the flow of gas, and the flow rate control valve 68 is opened accordingly. As a result, the gas pressure in the secondary-side line $L_1$ rises, causing the gas stagnating therein to increase. Thereafter, when the changeover valve $V_1$ is opened, the stagnating gas rushes into the chamber side through the changeover valve $V_1$, causing the gas overshooting phenomenon.

Here, the occurrence of overshooting of gas in the gas dividing and supplying system inevitably causes a decrease in operating efficiency of semiconductor manufacturing facilities etc. or a decrease in quality of products. Therefore, it is necessary to prevent the occurrence of overshooting as much as possible.

On the other hand, in recent years, in this type of gas dividing/supplying apparatus, a desire to reduce the apparatus in size and in cost has been increased, and to meet such a desire, as shown in FIG. 15, a gas dividing/supplying apparatus has been developed that controls a gas flow supplied from a gas supply source 1 to have a total flow rate Q by use of the pressure-type flow rate control device FCS as a flow rate control system 4 and also controls gas flows of divided flow passages $L_1$ to $L_n$ to have divided flow rates $Q_1$ to $Q_n$ with flow rate regulators 16, respectively.

In FIG. 15, reference symbol 1 designates the gas supply source, reference symbol 2 designates a pressure regulator, reference symbol 3 designates a pressure sensor, reference symbol 4 designates the flow rate control device (pressure-type flow rate control device FCS), reference symbols 5a and 5b designate pressure gauges, reference symbol 6 designates a thermal-type mass flow sensor (MFM), reference symbol 7 designates an electrically-operated valve, reference symbol 8 designates a valve driving portion, reference symbol 9 designates a vacuum pump, reference symbol 10 designates a throttle valve, reference symbol 11 designates a signal emitter, reference symbol 12 designates a PID controller, reference symbol 13 designates a process chamber, reference symbol 16 designates the flow rate regulator, reference symbol Sm designates a flow rate detecting signal, reference symbol Sa designates a flow rate setting signal, and reference symbol Sv designates a valve driving signal.

In the gas dividing/supplying apparatus of FIG. 15, the total flow rate Q of gas whose flow is controlled by the pressure-type flow rate control device (FCS) 4 is supplied to the divided flow passages $L_1$, $L_2$, and Ln in the divided flow rates $Q_1$, $Q_2$, and $Q_n$, respectively. In other words, the divided flow rates $Q_1$, $Q_2$, and $Q_n$ of gas flowing through the divided flow passages $L_1$, $L_2$, and $L_n$, respectively, are supplied to the process chamber 13 in such a way that, for example, in the divided flow passage $L_1$, the electrically-operated valve 7 is subjected to feedback control by means of the PID controller 12 according to the flow rate detecting signal Sm emitted from the flow sensor 6, and, as a result, the gas is controlled to have the divided flow rate $Q_1$ corresponding to the flow rate setting signal Sa emitted from the signal emitter 11 and is supplied to the process chamber 13. In FIG. 15, the flow rate regulators 16 of the divided flow passages $L_2$ to $L_n$ are not shown.

However, also in the gas dividing/supplying apparatus of FIG. 15, a peak appears in the flow rate detecting signal Sm of the thermal-type mass flow sensor (MFM) 6, and so-called overshooting occurs in the gas having the flow rate $Q_1$ flowing through the divided flow passage $L_1$, for example, immediately after starting a gas admission (referred to as "when gas is admitted for supply") into the divided flow passage $L_1$ by inputting the flow rate setting signal Sa from the signal emitter 11 and by starting the pressure-type flow rate control device (FCS) 4. This significantly decreases accuracy in control of gas of the divided flow rate $Q_1$.

The present inventors and others created a gas dividing and supplying system shown in FIG. 16 and repeat operation tests of the system as an approach for enhancing accuracy in control of gas of the divided flow rate $Q_1$ by preventing the occurrence of overshooting that is caused immediately after starting a gas admission.

In more detail, FIG. 16 is a schematic view showing a configuration of the whole of the gas dividing and supplying system under the operation tests, and predetermined divided flow rates $Q_1$ to $Q_4$ of gas G are supplied to a large-sized reactor (e.g., a large-sized process chamber) 15 through divided flow passages $L_1$ to $L_4$ of four systems (n=4).

In FIG. 16, reference symbol 15 designates the large-sized reactor, reference symbol 16 designates the flow rate regulator, reference symbols 16a to 16d designate switching-type controllers, reference symbols $Sv_1$ to $Sv_4$ designate valve driving signals, reference symbols $Sk_1$ to $Sk_4$ designate valve opening degree control signals, reference symbols $Sm_1$ to $Sm_4$ designate flow rate detecting signals, and reference symbols $Sa_1$ to $Sa_4$ designate flow rate setting signals. In FIG. 16, the same reference symbol is given to the same component or the same member as in FIG. 15.

Referring to FIG. 16, in a steady state, gas G that is emitted from a gas supply source 1 and regulated by a pressure regulator 2 so as to have pressure of 300 to 500 KPa (abs) is controlled to have a desired set flow rate Q (e.g., 1000 to 3000 sccm) in a pressure-type flow rate control device (FCS) 4, and is supplied to the divided flow passages $L_1$ to $L_4$.

In the divided flow passages $L_1$ to $L_4$, a divided flow rate control command signal Ss is input to each of the switching-type controllers 16a to 16d in each of the flow rate regulators 16 from outside, and thereafter the valve driving signals $Sv_1$ to $Sv_4$ are respectively input to valve driving portions 8a to 8d from the switching-type controllers 16a to 16d and feedback divided flow rate control is performed, and then electrically-operated valves 7a to 7d are driven, and, as a result, gas flows having the divided flow rates $Q_1$ to $Q_4$ respectively corresponding to the flow rate setting signals $Sa_1$ to $Sa_4$ are supplied to the reactor 15. In other words, the valve driving signals $Sv_1$ to $Sv_4$ are subjected to feedback control by the flow rate detecting signals $Sm_1$ to $Sm_4$ emitted from the thermal-type mass flow sensors 6a to 6d, respectively, and, as a result, gas flows of the divided flow rates $Q_1$ to $Q_4$ are controlled to have set divided flow rates corresponding to the flow rate setting signals $Sa_1$ to $Sa_4$, respectively.

When the pressure-type flow rate control device (FCS) 4 supplies gas to the divided flow passages $L_1$ to $L_4$ in a state in which its flow rate is not controlled as in a case in which gas G temporarily stops being supplied and then is again supplied (i.e., when gas starts to be admitted), an opening control command signal Sp is first input to each of the switching-type controllers 16a to 16d, thereby maintaining opening control mode in which the switching-type controllers 16a to 16d perform the opening control of the electrically-operated valves 7a to 7d, respectively.

As a result, the valve opening degree control signals $Sk_1$ to $Sk_4$ are output to the valve driving portions 8a to 8d of the electrically-operated valves 7a to 7d from the switching-type controllers 16a to 16d, respectively, and each of the electrically-operated valves 7a to 7d is maintained at a fixed opening degree that is predetermined by the valve opening degree control signals $Sk_1$ to $Sk_4$ respectively without being completely opened (i.e., in a partially-closed state).

Later, when a state is reached in which flow rate control is performed by the pressure-type flow rate control device (FCS) 4 after a fixed time (e.g., 0.1 seconds to 1 second) elapses and gas having the controlled total flow rate Q is supplied, the divided flow rate control command signal Ss is input and the control mode of the switching-type controllers 16a to 16d is automatically (or manually) switched from a valve opening degree control state to a divided flow rate control state, and the divided flow rates $Q_1$ to $Q_4$ of gas flowing through the divided flow passages $L_1$ to $L_4$ are controlled to have set divided flow rates by means of feedback control based on the flow rate detecting signals $Sm_1$ to $Sm_4$ emitted from the thermal-type mass flow sensors 6a to 6d, respectively.

It should be noted that the valve opening degree control signals $Sk_1$ to $Sk_4$ for the opening control mode are pre-set appropriately, for example, based on the total flow rate in the pressure-type flow rate control device (FCS) 4 or the divided flow ratio ($Q_1/Q_2/Q_3/Q_4$).

Additionally, a cam drive type open-close valve whose driving source is a pulse motor is used as each of the electrically-operated valves 7a to 7d.

FIG. 17 is a descriptive view of a configuration of the switching-type controller 16a, which is a main part of the flow rate control device, and reference symbol 17 designates a valve opening degree control command signal emitter, reference symbol 18 designates a divided flow rate control command signal emitter, reference symbol 19 designates a control switching mechanism, reference symbol 20 designates a valve opening degree control mechanism, reference symbol 21 designates a divided flow rate control mechanism based on the flow rate detecting signal Sm emitted from the thermal-type mass flow sensor 6, reference symbol 23 designates an input terminal of the flow rate detecting signal Sm, and reference symbol 24 designates an input terminal of the control switching signal Sx emitted from the pressure-type flow rate control device (FCS) 4.

When gas starts to be admitted (i.e., when the pressure-type flow rate control device (FCS) 4 supplies gas to the divided flow passages in a state in which its flow is not controlled), an opening control command signal Sp is firstly input from the valve opening degree control command signal emitter 17 to the valve opening degree control mechanism 20 through a terminal 22, and a valve opening degree control signal Sk, which is pre-set (e.g., 40% opening degree, 50% opening degree) is input from the valve opening degree control mechanism 20 to the valve driving portion 8, so that the electrically-operated valve 7 is maintained at a predetermined valve opening degree.

Of course, the valve opening degree control command signal emitter 17 is provided with an input mechanism of the valve opening degree control signal Sk.

When flow rate control is performed by the pressure-type flow rate control device (FCS) 4 and the total flow rate Q is controlled accordingly, a control switching signal Sx is input from the terminal 24 to the control switching mechanism 19, and this triggers the divided flow rate control command signal Ss to be emitted, then the divided flow rate control mechanism 21 is actuated accordingly, and feedback control of the valve driving signal Sv is implemented based on the flow rate detecting signal Sm emitted from the thermal-type mass flow sensor 6 and the flow rate setting signal Sa emitted from a flow rate setting mechanism attached to the divided flow rate control command signal emitter 18, and the divided flow is controlled by the electrically-operated valve 7.

Of course, switching to divided flow rate control by means of the divided flow rate control mechanism 21 may be performed also by automatically emitting the control switching signal Sx to the control switching mechanism 19 when a fixed time elapses after the actuation of the valve opening degree control mechanism 20 instead of inputting the control switching signal Sx from the input terminal 24, or may be performed by inputting the divided flow rate control command signal Ss to the control switching mechanism 19 from the divided flow rate control command signal emitter 18.

Preferably, the valve opening degree (i.e., the valve opening degree control signal Sk) is set in such a way that the valve opening degree of the electrically-operated valve 7 of when flow rate control is performed for a target flow rate (i.e., the set flow rate Sa) by use of the gas dividing/supplying apparatus is stored in a memory, and then the stored valve opening degree is pre-input and pre-set as the valve opening degree control signal Sk in the valve opening degree control mechanism 20.

Not like the conventional gas dividing/supplying apparatus shown in FIG. 15 that fully opens all the electrically-operated valves 7 in each of the divided flow passages when gas starts to be admitted, the gas dividing/supplying apparatus shown in FIG. 16 is capable of preventing the occurrence of overshooting at the time when gas starts to be admitted, which is caused by a delay in opening control of the electrically-operated valves 7, by maintaining the valves 7 at a predetermined valve opening degree in advance, and as a result, accuracy of divided flow rate control is enhanced significantly.

However, there are still many issues need to be solved left in the gas dividing/supplying apparatus of FIG. 16. For example, a pulse electrically-operated cam drive type valve is often used as the electrically-operated valve 7 as the valve is capable of control relatively large flow, however, in the pulse motor-operated cam drive type valve, a position of the valve element in fully-closed state is regulated with a spring mechanism with applying a fixed pressing load to a valve sheet, and therefore miniaturization and simplification of the electrically-operated valve 7 is not easily attainable due to the spring mechanism and positioning of the valve element in fully-closed state itself is troublesome. Additionally, sheet-leaking often occurs when the valve is fully-closed. (Japanese Published Unexamined Patent Application No. 2008-57594, Japanese Published Unexamined Patent Application No. 2011-117473 etc.)

Also, a so-called temperature drift easily happens in a zero point output value of the thermal-type mass flow sensor 6 and, as a result, accuracy of divided flow rate control fluctuates.

Further, the detected flow rate value is pressure-dependent and the detected flow rate of the thermal-type mass flow sensor 6 fluctuates generally based on pressure in the flow rate regulating layer. Therefore, there are issues of decrease in accuracy of opening degree control and divided flow rate control.

Moreover, the pressure in the flow rate regulating layer that brings the smallest amount of error in the detected flow rate varies with each of the thermal-type mass flow sensors. As a result, under reduced-pressure environment, such as 100 Torr or under, an issue of decreased divided flow rate control accuracy of each of the divided flow passages $L_1$ to $L_n$ is caused by the difference among the pressures in the flow rate regulating layers of the thermal-type mass flow sensors.

Furthermore, PID control parameters for the switching-type controllers 16a to 16d, which are main parts of the divided flow rate control devices, are all set as fixed values and the divided flow rate controls are conducted by the fixed PID control parameters whether the total flow rate Q is high or low, and as a result, control responsiveness and control accuracy are not enhanced because the PID control parameters are not the most suitable for controlling.

Also, all the electrically-operated valves 7a to 7d are controlled simultaneously as well as concurrently to have predetermined opening degrees based on the valve driving signals $Sk_1$ to $Sk_4$ that are suitably set according to the total flow rate Q or the divided flow ratio ($Q_1/Q_2/Q_3/Q_4$). Therefore, the controls of the opening degree interfere mutually and the controls easily become unstable, and as a result, it takes longer time for the controls to be stabilized. This lowers responsiveness of the divided flow rate control and the control responsiveness may not be enhanced.

SUMMARY OF THE INVENTION

Problems to be Solved by the Invention

The present invention is for solving the aforementioned problems in a conventional gas dividing/supplying apparatus, and it is a main object of the present invention to provide a gas dividing and supplying system with high divided flow rate (divided flow ratio) control accuracy and high control responsiveness, that simplifies and miniaturizes its structure by (a) easily and at low cost preventing the occurrence of overshooting of gas when the gas starts to be admitted into divided flow passages, (b) seeking to simplify and miniaturize a structure of an electrically-operated valve 7, to make positioning of the valve element in a fully-closed state easy, and to prevent the occurrence of sheet-leaking when the valve is fully-closed, (c) preventing deterioration in accuracy of valve opening degree control and divided flow rate control that is caused by zero-point temperature drift in a detected flow rate by a thermal-type mass flow sensor 6 and pressure-dependence of an error in a detected flow rate, (d) enhancing control responsiveness and control accuracy with the most suitable PID control parameter that is depending on whether a total flow rate Q is high or low, and (e) preventing valve opening degree controls from interfering each other by firstly fixing a flow passage with the highest flow rate at a predetermined opening degree for enhancing responsiveness of divided flow rate control.

Means for Solving the Problems

In a first aspect of a gas dividing/supplying apparatus in accordance to the present invention, there are provided a flow rate control device of gas from a gas supply source, a plurality of divided flow passages $L_1$ to $L_n$ that are connected in parallel with each other and through which gas flowing from the flow rate control device is divided and supplied to a location where the gas is used, thermal-type mass flow sensors 29a to 29n disposed to the divided flow passages $L_1$ to $L_n$, respectively, electrically-operated valves $28_1$ to $28_n$ disposed on a downstream side of the thermal-type mass flow sensors $29_1$ to $29_n$, respectively, controllers 16a to 16n that control the opening and the closing of the electrically-operated valves $28_1$ to $28_n$, respectively, and a flow ratio setting calculator RSC that receives a flow ratio command that is input from outside and also calculates a total flow rate based on flow rates of the thermal-type mass flow sensors $29_1$ to $29_n$, then calculates flow rates of the divided flow passages $L_1$ to $L_n$ based on the calculated total flow rate as well as the flow ratio command, and then inputs the calculated flow rates as set flow rates to controllers $16_a$ to $16_n$, respectively, wherein, firstly, one of the divided flow passages $L_1$ to $L_n$ with the highest set flow rate, which is entered by the flow ratio setting calculator RSC, is put in an uncontrolled state with maintaining a fixed valve opening degree, and opening degree for each of the rest divided flow passages $L_1$ to $L_n$ is controlled to each set opening degree, and then feedback control of the divided flow rate of each of the divided flow passages $L_1$ to $L_n$ is implemented by the controllers 16a to 16n, respectively.

A second aspect of the present invention is characterized in that, in the invention of the first aspect, the valve opening degree is maintained at 75%.

A third aspect of the present invention is characterized in that, in the invention of the first aspect, PID control parameters of when the divided flow rates are subject to feedback control by which the opening degrees of the electrically-operated valves $28_1$ to $28_n$ are regulated based on flow rate detecting signals Sm emitted from the thermal-type mass flow sensors $29_1$ to $29_n$ via the controllers 16a to 16n are adjusted based on the total flow rate of gas flowing from the flow rate control device.

A fourth aspect of the present invention is characterized in that, in the invention of the first aspect, the electrically-operated valves $28_1$ to $28_n$ are pulse motor-operated cam drive type valves whose valve elements are diaphragms made of stainless steel and valve sheets are made of elastic resin, and contact pressure between each of the valve elements and valve sheets of when the valves are fully-closed is created by elasticity of the valve sheets.

A fifth aspect of the present invention is characterized in that, in the invention of the first aspect, the flow rate control device is a pressure-type flow rate control device and each of the controllers 16a to 16n may be switched between valve opening degree control mode and divided flow rate control mode.

A sixth aspect of the present invention is characterized in that, in the invention of the first aspect, the number of the divided flow passages is arranged to fall within a range of two to four, and the valve opening degrees of the electrically-operated valves 7 during the valve opening degree control is set between 40% and 70% of that of the valve that is fully opened.

A seventh aspect of the present invention is characterized in that, in the invention of the first aspect, the thermal-type mass flow sensors $29_1$ to $29_n$ correct zero-point temperature drifts by using stored information of relation between each temperature of the thermal-type mass flow sensors $29_1$ to $29_n$ and each zero-point temperature, which is stored in the controllers 16a to 16n beforehand, respectively.

A eighth aspect of the present invention is characterized in that, in the invention of the first aspect, the thermal-type mass flow sensors $29_1$ to $29_n$ correct errors in detected flow rates by using stored information of relation between each detected flow rate of the thermal-type mass flow sensors $29_1$ to $29_n$ and each pressure in flow rate detecting portions, which is stored in the controllers 16a to 16n beforehand, respectively.

A ninth aspect of the present invention is characterized in that, in the invention of the first aspect, each of the thermal-type mass flow sensors $29_1$ to $29_n$ includes a flow regulating layer portion, which is comprised of a plurality of pipes that are coordinated in parallel, for reducing a difference between a detected flow rate and a flow rate of supplied gas flow by reducing pressure drop in the flow regulating layer portion.

A method for dividing and supplying gas in accordance to the present invention, and characterized in that, the flow ratio command is input to the flow ratio setting calculator RSC from outside by using the gas dividing/supplying apparatus of the first aspect of the present invention, and gas from the gas supply source is supplied from the flow rate control device to each of the divided flow passages, and also the total flow rate is calculated in the flow ratio setting calculator RSC based on the flow rates detected by the thermal-type mass flow sensors $29_1$ to $29_n$, then flow rates that each of the divided flow passages $L_1$ to $L_n$ requires are calculated from the calculated total flow rate and the flow ratio command, and the calculated flow rates are input as set flow rates to each of the controllers 16a to 16n, respectively, wherein, firstly, a divided flow passage with the highest set flow rate that is input by the flow ratio setting calculator RSC is distinguished in the divided flow passages $L_1$ to $L_n$, and then the distinguished divided flow passage is put in an uncontrolled state with maintaining the valve opening degree fixed, and the flow ratio is adjusted by controlling the opening degrees of the other divided flow passages, and after that, feedback control of the flow rate of each of the divided flow passages $L_1$ to $L_n$ is implemented by the controllers 16a to 16n, respectively.

Effects of the Invention

In the present invention, a flow rate control device of gas from a gas supply source, a plurality of divided flow passages $L_1$ to $L_n$ that are connected in parallel with each other and through which gas flowing from the flow rate control device is divided and supplied to a location where the gas is used, thermal-type mass flow sensors $29_1$ to $29n$ disposed to the divided flow passages $L_1$ to $L_n$, respectively, electrically-operated valves $28_1$ to $28_n$ disposed on a downstream side of the thermal-type mass flow sensors $29_1$ to $29_n$, respectively, controllers $16a$ to $16n$ that control the opening and the closing of the electrically-operated valves $28_1$ to $28_n$, respectively, and a flow ratio setting calculator RSC that receives a flow ratio command that is input from outside and also calculates a total flow rate based on flow rates of the thermal-type mass flow sensors $29_1$ to $29_n$, then calculates flow rates of the divided flow passages $L_1$ to $L_n$ based on the calculated total flow rate as well as the flow ratio command, and then inputs the calculated flow rates as set flow rates to controllers $16_a$ to $16_n$, respectively, wherein, one of the divided flow passages $L_1$ to $L_n$ with the highest set flow rate, which is input by the flow ratio setting calculator RSC, is put in an uncontrolled state with maintaining a fixed valve opening degree, and opening degree of each of the rest divided flow passages $L_1$ to $L_n$ is controlled and adjust a flow ratio, and then feedback control of the flow rate of each of the divided flow passages $L_1$ to $L_n$ is implemented by the controllers $16a$ to $16n$, respectively.

As a result, an occurrence of a transient flow-in of the divided gas (overshooting phenomenon) when gas is admitted for supply to each of the divided flow passages $L_1$ to $L_n$ is effectively prevented and the gas is provided to a location where the gas is used through divided flow passages $L_1$ to $L_n$ under a highly accurate divided flow rate control.

Additionally, while one of the divided flow passages $L_1$ to $L_n$ with the highest set flow rate that is input by the flow ratio setting calculator RSC is put under uncontrolled state with maintaining a fixed valve opening degree, the valve opening degrees of the other divided flow passages are controlled and then the flow ratio is adjusted accordingly. As a result, as responsiveness of valve opening degree controls are increased, instability of the controls due to a mutual interference of the valve opening degree controls is decreased, and this shortens time required until the controls become stable and responsiveness of divided flow rate controls are enhanced accordingly.

Further, responsiveness and accuracy of the controls are significantly enhanced by feedback control with the most suitable PID control parameters appropriate to total flow rate of supplied gas.

Moreover, simplification and miniaturization of the structure of the gas dividing/supplying apparatus become possible and this result in production cost reduction.

BRIEF DESCRIPTION OF THE DRAWINGS

FIG. 2 is a schematic view of a structure of the divided flow rate controlling portion that comprises the gas dividing/supplying apparatus and (a) is a longitudinal sectional schematic view, (b) is a right-side schematic view and (c) is a left-side schematic view.

FIG. 7 (a) is a descriptive view showing a divided flow rate control operation in each divided flow rate controlling portion of a second divided flow passage $L_2$ to a fourth divided flow passage $L_4$ and (b) is a descriptive view showing a switching status of a PID control in step S17.

MODES FOR CARRYING OUT THE INVENTION

Figure 1:
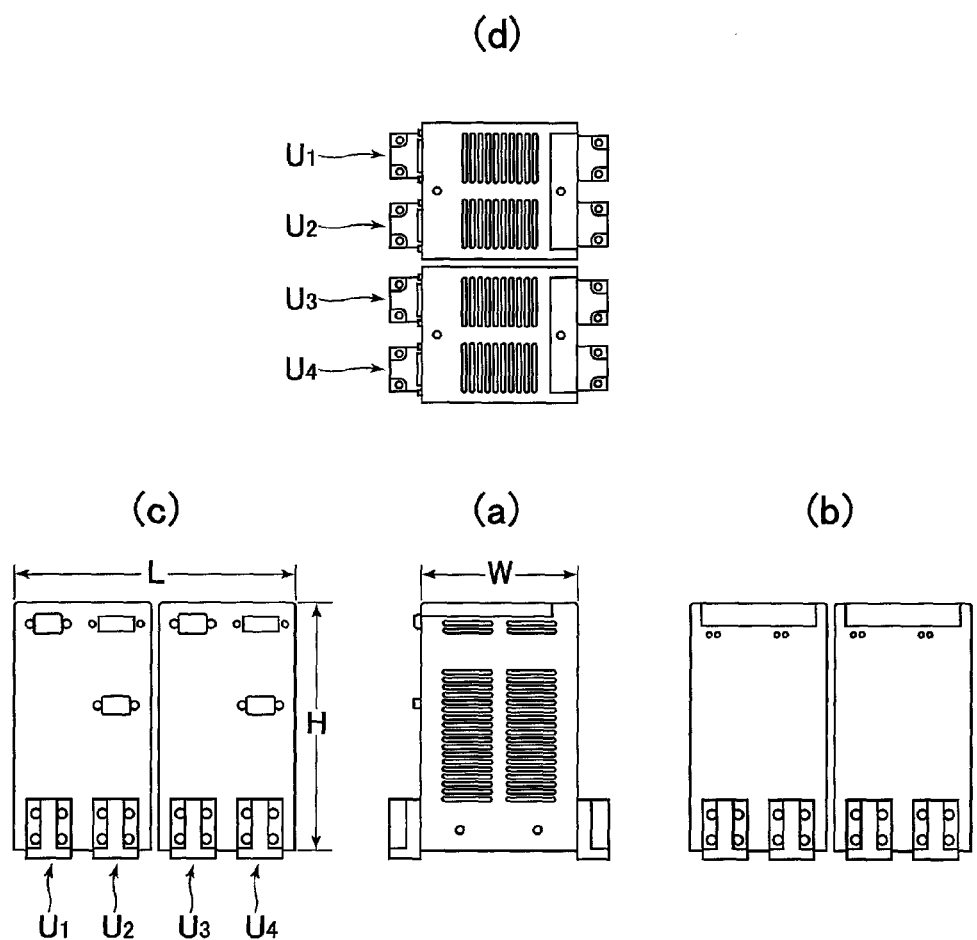
FIG. 1 is a full view of a divided flow rate controlling portion of a gas dividing/supplying apparatus with four divided flow passages according to the present invention and (a) is a front schematic view, (b) is a right-side schematic view, (c) is a left-side schematic view and (d) is a schematic plan view.

Hereinafter, an embodiment of the present invention will be described with reference to drawings. FIG. 1 is an external view of a divided flow rate controlling portion of a gas dividing/supplying apparatus with four divided flow passages according to an embodiment of the present invention and (a) is a front view, (b) is a right-side view, (c) is a left-side view and (d) is a plan view. In the embodiment, four divided flow rate controlling portions $U_1$ to $U_4$ are configured to supply gas G, which is divided based on predetermined divided flow rates $Q_1$ to $Q_4$, to four locations where the gas is used through divided flow passages $L_1$ to $L_4$ of four systems (n=4) respectively, by being combined integrally in parallel (arranged side by side).

On the other hand, external dimensions of the gas dividing/supplying apparatus with four divided flow passages are approximately 160 mm (height), 100 mm (width) and 180 mm (length), and the portion $U_1$ together with the portion $U_2$ and the portion $U_3$ together with the portion $U_4$ are configured as one piece each.

Here, a first divided flow passage $L_1$ is also called a main divided flow passage or a master line, however the first divided flow passage $L_1$ is the name to use in the present invention. Similarly, the divided flow rate controlling portion $U_1$ for the first divided flow passage $L_1$ is also called a main divided flow rate controlling portion or a master divided flow rate controlling portion, however the divided flow rate controlling portion is simply the name to use in the present invention.

FIG. 2 is a schematic view of a structure of one of the divided flow rate controlling portions that comprises the gas dividing/supplying apparatus and (a) is a longitudinal sectional schematic view, (b) is a right-side schematic view and (c) is a left-side schematic view. In FIG. 1 and FIG. 2, each of the divided flow rate controlling portions $U_1$ to $U_4$ comprises a stainless steel-made base body 25, an inlet-side block 26 and an outlet-side block 27 that are fixed on both sides of the body 25, an electrically-operated cam type valve 28, a thermal-type mass flow sensor 29, a control circuit board 30, a casing 32 and a fixing screw 31 etc., and a gas passage 25a, a thermal-type mass flow sensor insertion hole 25b and a valve body insertion hole 25c etc. are provided to the base body 25.

Also, a gas inlet 26a and a gas passage 26b are provided to the inlet-side block 26 and a gas outlet 27a and a gas passage 27b are provided to the outlet-side block 27.

The electrically-operated cam type valve 28 comprises a valve body 28a that is screwed-in and fixed to the valve body insertion hole 25c on the base body 25, a valve element 28c, which is a metal diaphragm and provided at bottom of the valve body 28a, a valve sheet 28b made of synthetic resin that serves as a base, a valve element holder 28d, a linear bushing 28e, a stem 28f, a cam roller 28h, which is supported at top of the stem 28f through a bearing 28g, a cam board 33 that abuts on the cam roller 28h, a stepping motor 34, a motor axis 34a and stroke regulating screws 35 and 36 etc.

Here, the thermal-type mass flow sensor 29 is mounted in the thermal-type mass flow sensor insertion hole 25b on the base body 25 and comprises a flow regulating layer portion 29a for regulating flow and a flow rate detecting portion 29b etc. Furthermore, reference symbol 39 designates a gas temperature detecting portion that is provided in the base body 25.

By the way, a basic configuration of the electrically-operated cam type valve 28 except for a stroke regulating mechanism, a configuration of the thermal-type mass flow sensor 29, configurations of the stainless steel-made base body 25 as well as the inlet-side block 26 and the outlet-side block 27 that are fixed on both sides of the base body, and an assembling structure for the electrically-operated cam type valve 28, the thermal-type mass flow sensor 29, the control circuit board 30 and the casing 32 etc. are already well-known and not described in detail here.

Figure 3:
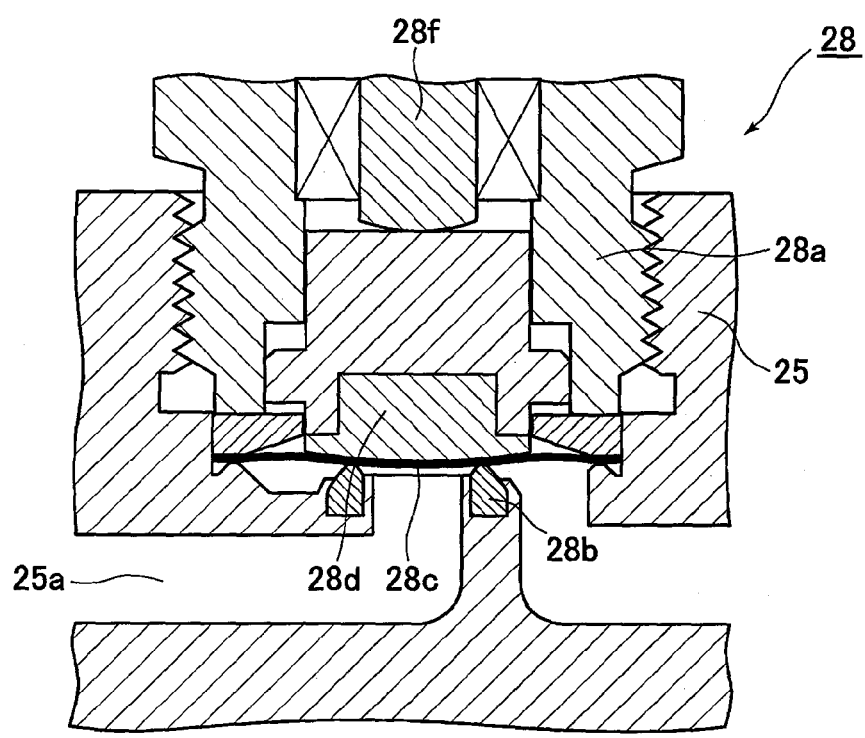
FIG. 3 is a partial enlargement view of a valve component of a cam type valve of FIG. 2 (a).

FIG. 3 is a partial enlargement view of the valve component of the electrically-operated cam type valve 28 and sealing between the valve sheet 28b and the diaphragm valve element 28c is ensured by elastic reaction of the valve sheet 28b itself that is generated when an outer side of the diaphragm valve element 28c is pushed towards top of the valve sheet 28b made of synthetic resin like PCTFE that is fixed to side of the base body 25. In other words, the stem 28f and the valve element holder 28d do not have any mechanisms like a spring for regulating pushing pressure as the conventional electrically-operated cam type valve has, and sealing between the valve sheet 28b and the diaphragm valve element 28c is ensured by elasticity of the valve sheet 28b itself.

Here, a structure itself of the valve element is the same as the one of a conventional metal-made diaphragm type valve.

Regulation of the stem 28f and a stroke of the valve element holder 28d (lower-end position of the valve element holder 28d of when the valve is fully opened) is conducted by adjusting screwing amount of the stroke regulating screws 35 and 36, and in such manner, a spring or any other components used for elasticity adjustment in the conventional electrically-operated cam type valve are not required and sealing function is secured by elasticity of the valve sheet 28b. As a result, simplification and significant miniaturization of the electrically-operated cam type valve 28 may be achieved.

Figure 4:
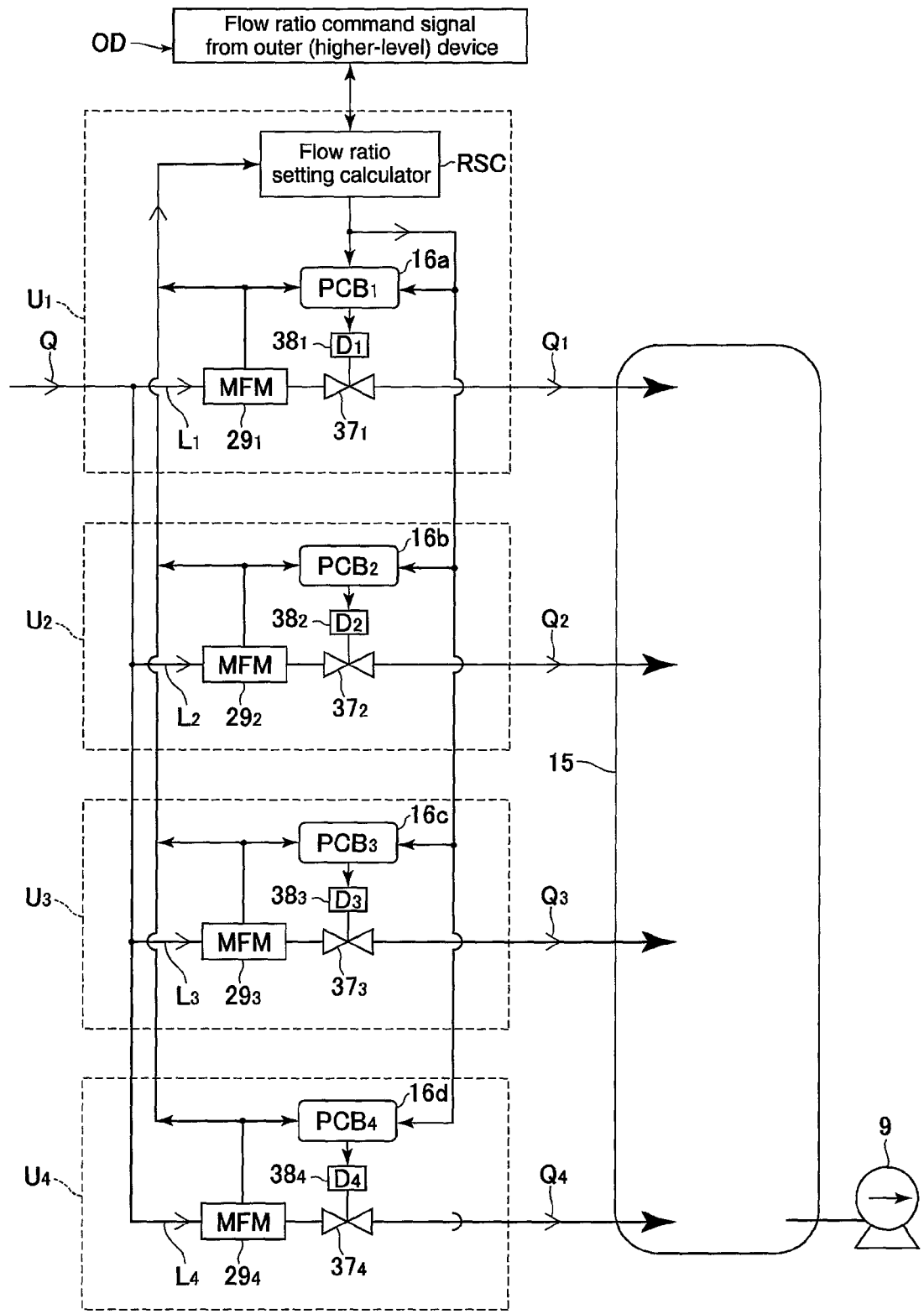
FIG. 4 is a system diagram showing a configuration of the divided flow rate controlling portion in the gas dividing/supplying apparatus with four divided flow passages.
Figure 5:
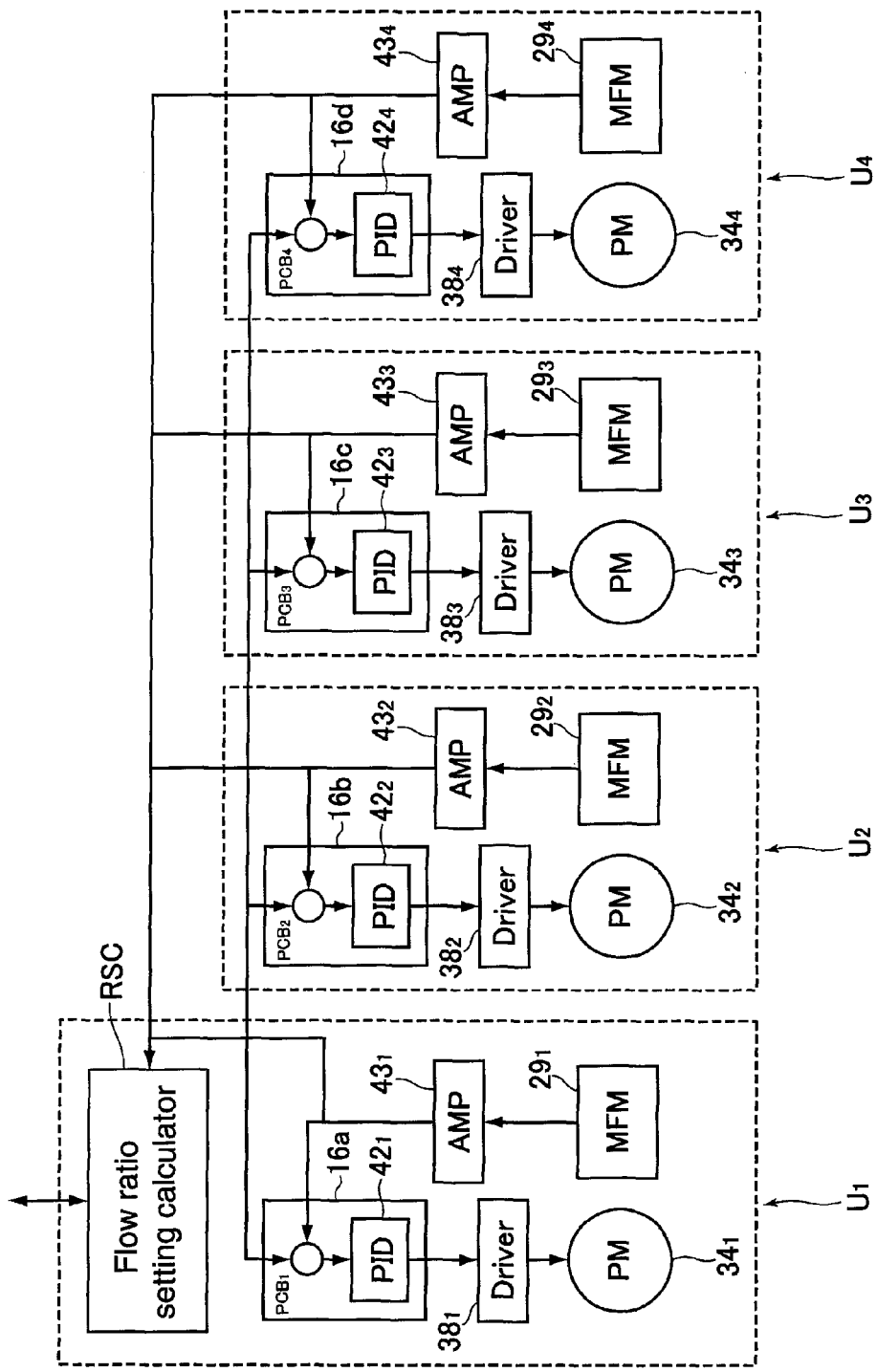
FIG. 5 is a block diagram showing a configuration of the divided flow rate controlling portion in the gas dividing/supplying apparatus with four divided flow passages.

FIG. 4 is a schematic view showing a configuration of the whole of the divided flow rate controlling portion that comprises the main part of the gas dividing/supplying apparatus with four divided flow passages according to an embodiment of the present invention that conducts divided flow rate control of the four divided flow passages $L_1$ to $L_4$. FIG. 5 shows a configuration of components in the divided flow rate controlling portion and is substantially the same as FIG. 4.

Figure 16:
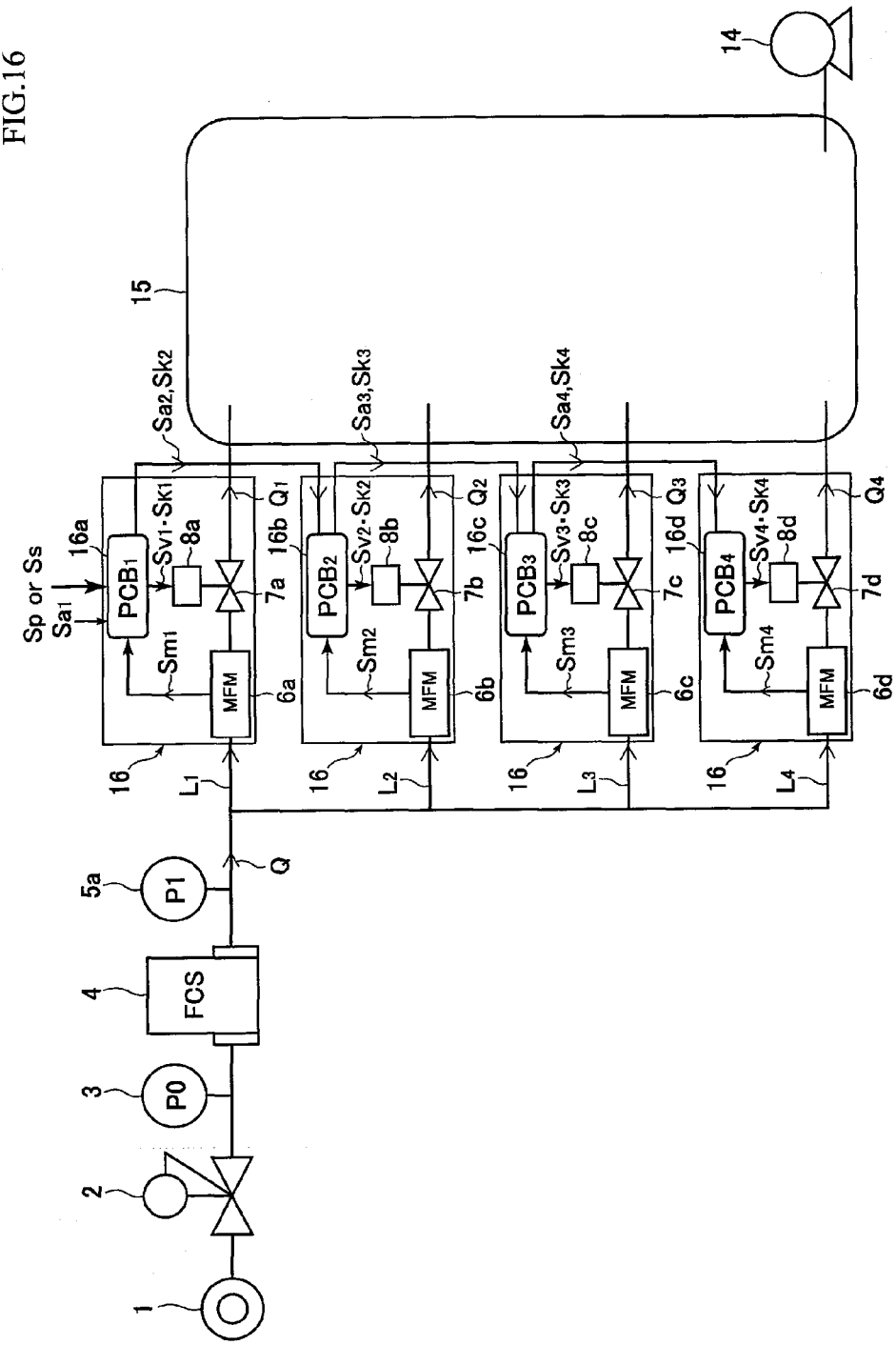
FIG. 16 is a system diagram of a configuration of a gas dividing/supplying apparatus that was developed earlier.
Figure 17:
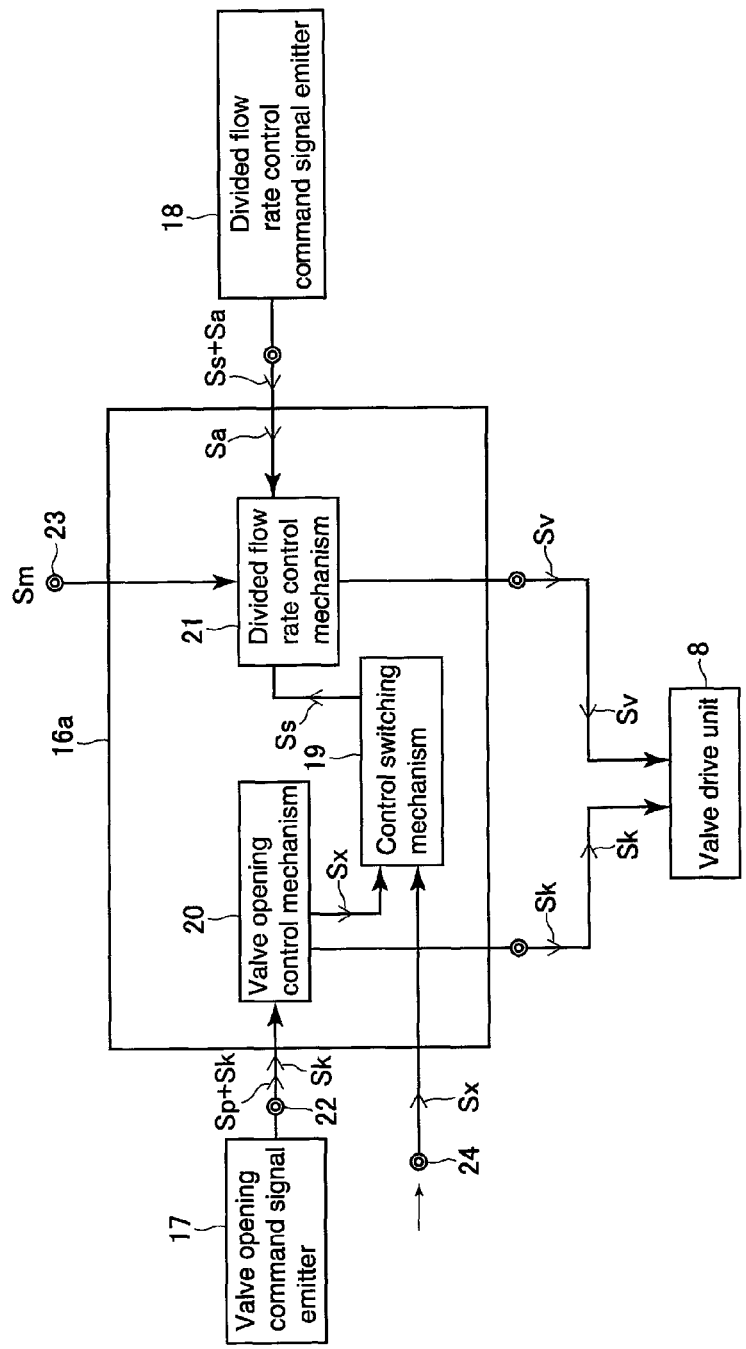
FIG. 17 is a descriptive view showing a configuration and an operation of a switching-type controller that was developed earlier.

Of course, besides the divided flow rate controlling portion, a gas supply source 1, a pressure regulator 2 and a flow rate control device etc. shown in FIG. 16 are required for the gas dividing/supplying apparatus.

Referring to FIG. 4 and FIG. 5, the divided flow rate controlling portion is for dividing gas of a total flow rate Q, which is supplied from a gas supply source (not shown), and supplying the divided gas of flow rates $Q_1$, $Q_2$, $Q_3$ and $Q_4$ to a location like a reactor 15 where the gas is used. By the way, FIG. 4 shows a case of dividing and supplying gas to the four divided flow passages $L_1$ to $L_4$, however the number of the divided flow passages may be 2 or 3, or more than 4.

In FIG. 4 and FIG. 5, reference symbol Q designates the total flow rate, reference symbols $Q_1$, $Q_2$, $Q_3$ and $Q_4$ designate the divided flow rates, reference symbol $U_1$ designates the divided flow rate controlling portion for the divided flow passage $L_1$, reference symbols $U_2$, $U_3$ and $U_4$ designate the divided flow rate controlling portions for the divided flow passages $L_2$, $L_3$ and $L_4$, respectively, reference symbols $29_1$ to $29_4$ designate the thermal-type mass flow sensors (MFM), reference symbols 16a to 16d designate switching-type controllers ($PCB_1$ to $PCB_4$), reference symbol 15 designates the reactor, reference symbol 9 designates a vacuum pump, reference symbols $37_1$ to $37_4$ designate valve components of the electrically-operated cam type valves ($V_1$, $V_2$, $V_3$, $V_4$), reference symbols $38_1$ to $38_4$ ($D_1$, $D_2$, $D_3$, $D_4$) designate valve driving portions. Reference symbols $42_1$ to $42_4$ designate PID parameter regulating mechanisms and reference symbols $43_1$ to $43_4$ designate amplifiers.

The switching-type controllers 16a, 16b, 16c and 16d may be integrally formed and in that case, the same circuit board is used for each of the controllers 16a, 16b, 16c and 16d, and as a result, a flow ratio setting calculator RSC is equipped in each of the controllers 16a, 16b, 16c and 16d, and the controller 16a for the first divided flow passage $L_1$ and the controllers 16b, 16c and 16d for the divided flow passages $L_2$ to $L_4$ are configured separately at the time of shipment so that only the flow ratio setting calculator RSC for the controller 16a for the first divided flow passage $L_1$ is operated. In FIG. 4, the controller $PCB_1$ (16a) is set as the controller 16a for the first divided flow passage.

Now, a control operation of the divided flow rate controlling portion is described.

Referring to FIG. 4, the flow ratio setting calculator RSC is provided to the switching-type controller $PCB_1$ (16a) in the divided flow rate controlling portion $U_1$ (the first divided flow passage $L_1$) and, a flow ratio command is input from a higher-level device or an outer device OD and when required, a flow rate of each of the divided flow passages and/or a divided flow ratio (flow ratio) at the time of calculation is output from the flow ratio setting calculator RSC to the higher-level device or the outer device OD.

The flow ratio setting calculator RSC sets a flow ratio for the switching-type controllers 16a to 16d of each of the dividing flow passages $L_1$ to $L_4$ based on the flow ratio command signal input from the higher-level device or the outer device OD, and calculates the total flow rate Q and the flow ratio of each of the divided flow passages $L_1$ to $L_4$ from a flow rate detecting signal emitted from each of the thermal-type mass flow sensors $29_1$ to $29_4$.

The flow ratio setting calculator RSC also outputs the calculated flow ratio to each of the controllers 16a to 16d and checks a valve opening degree command signal emitted from each of the controllers 16a to 16d and an opening degree of each of the electrically-operated cam type valves 28 of each divided flow passage.

In other words, as described hereinafter, each of the switching-type controllers 16a to 16d firstly controls the valve opening degree of each of the electrically-operated cam type valves 28 based on the flow ratio command in valve opening degree control mode, and implements feedback control of each valve opening degree of each of the electrically-operated cam type valves 28 by means of PID control in divided flow rate control mode, and then operates the valve driving portions $38_1$ to $38_4$ so as to have flows of the predetermined flow rates of $Q_1$, $Q_2$, $Q_3$ and $Q_4$ that are specified by the flow ratio setting calculator RSC.

Here, PID controlling information is previously stored in each of the controllers 16a to 16d, and the most suitable PID control constant (control parameter) is selected based on the specified divided flow rates $Q_1$, $Q_2$, $Q_3$ and $Q_4$, and the feedback control of each of the electrically-operated cam type valves 28 is implemented by means of PID control.

Figure 6:
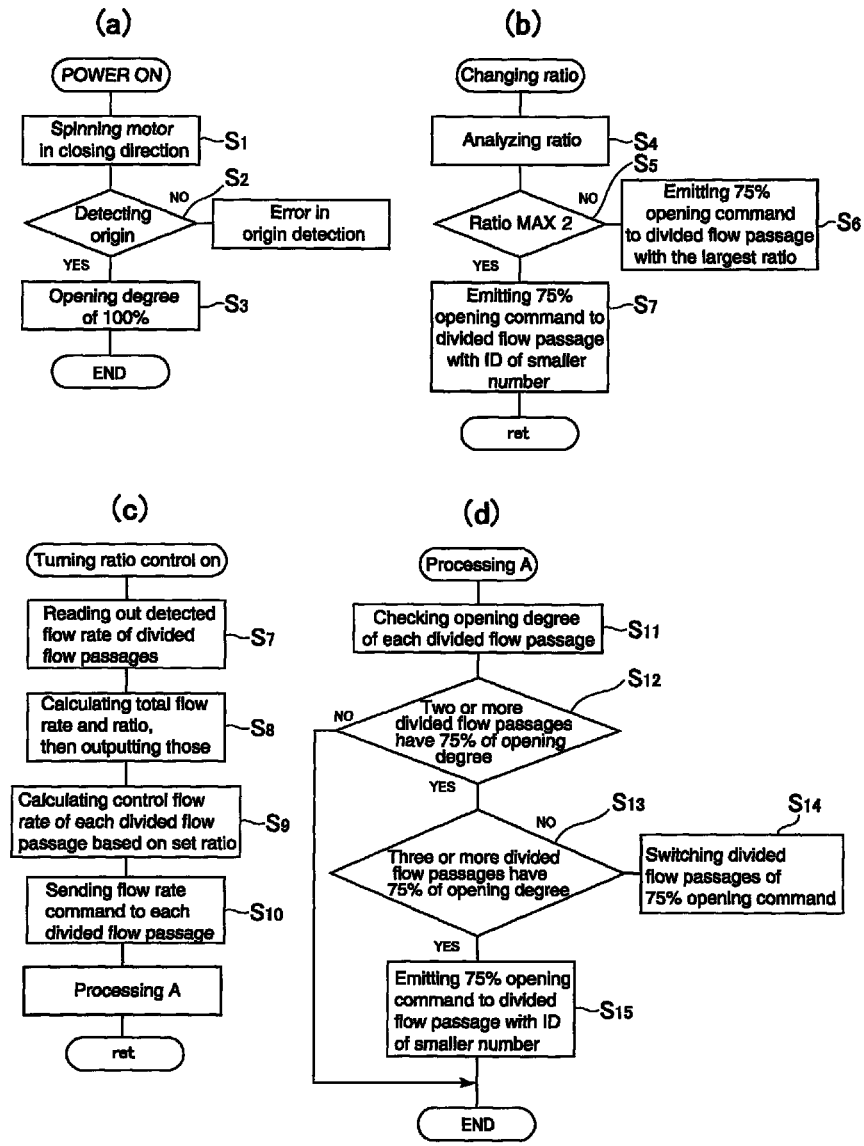
FIG. 6 is a descriptive view showing an operation of the divided flow rate controlling portion in the gas dividing/supplying apparatus according to the present invention and (a) shows a power-on (activation) operation, (b) shows an operation for selecting a divided flow passage, which will maintain a fixed opening degree, in case a flow ratio of a first divided flow passage $L_1$ is changed, (c) shows an operation for controlling a flow rate of each divided flow passage in the divided flow rate controlling portion of the first divided flow passage $L_1$ and (d) shows a detail of a processing A of (c).

FIG. 6 shows a specific operation sequence of each divided flow rate controlling portion etc., and as shown in FIG. 6 (*a*), when power is supplied to the gas dividing/supplying apparatus, each divided flow rate controlling portion etc are activated and each of the switching-type controllers 16a to 16d is switched to the opening control mode at first. Then, a motor 34 of each of the electrically-operated cam type valves 28 is spun to a valve-closing direction (S1), and an origin of an valve opening of when the valve is fully-closed is firstly detected (S2). After the origin is detected, then the valve opening degree of each of the valves 28 is maintained at 100% for the moment (S3).

After that, the flow ratio setting calculator RSC inputs the flow ratio command received from the outer device (the higher-level device) OD to the divided flow rate controlling portion $U_1$ for the first divided flow passage, and the flow ratio of the first divided flow passage $L_1$ is changed (set) (FIG. 6 (*b*)). In other words, when the flow ratio of the first divided flow passage $L_1$ is set or changed, the flow ratio is analyzed (S4) and it is determined if there are two or more divided flow passages with the highest set flow ratio (divided flow ratio) (S5) as shown in FIG. 6 (*b*). In case there is only one divided flow passage with the highest flow ratio, the opening degree of the electrically-operated valve 28 of the divided flow passage with the highest flow ratio is maintained at 75% (S6). Or, in case there are two or more divided flow passages with the highest flow ratio, the opening degree of the electrically-operated valve 28 of the divided flow passage with a designated ID of smaller number is fixed and maintained at 75% (S7)

Once the divided flow passage with the highest flow ratio (divided flow ratio) is selected and the valve opening degree of the electrically-operated valve of the selected divided passage is fixed (at 75%) in the valve opening degree control mode, the switching-type controllers 16a to 16d are switched to the divided flow rate control mode and divided flow rate control of each of the divided flow passages is conducted. Here, a reason why the opening degree of the divided flow passage with the highest flow ratio (divided flow ratio) is maintained at 75% is that a normal electrically-operated valve is designed to control the highest flow at approximately 75% of the valve opening degree and control ability is significantly decreased when the opening degree goes over 75%. The valve opening degree of 75% may be changed appropriately between 40% and 80% depend on the type of electrically-operated valve.

In the divided flow rate controlling portion $U_1$ for the first divided flow passage $L_1$, as shown in FIGS. 6 (*c*) and (*d*), when the flow ratio control is turned on, the detected flow rate of each of the divided flow passages is readout at first (S7), then the total flow rate and the flow ratio are calculated and output (S8), and a control flow rate of each of the divided flow passages is calculated based on the set flow ratio (divided flow ratio) (S9), and the calculated flow rate command is output to each of the divided flow passages (S10), and then the opening degree of the valve of each divided flow passage is rechecked (S11), and in case the number of the valves with the opening degree of 75% is one, the process by the divided flow rate controlling portion $U_1$ for the first divided flow passage $L_1$ is finished, then PID feedback control of the switching-type controller 16a is implemented. Of course, PID feedback controls of the switching-type controllers of the other divided flow rate controlling portions are also implemented simultaneously.

In case the number of the valves with the opening degree of 75% is two or more, it is determined whether the number of the valves with the opening degree of 75% is two or three (S13), and when the number of the valves is two, the divided flow passages under the command of the opening degree of 75% are switched (S14). In other words, the opening degree of the electrically-operated valve whose flow rate is increasing is fixed.

In case the number of the valves is three, a 75% opening command is input to the electrically-operated valve of the divided flow passage with a designated ID of smaller number (S15).

A processing A shown in FIG. 6 (*d*) is conducted by the flow ratio setting calculator RSC of the divided flow rate controlling portion $U_1$ of the first divided flow passage $L_1$ based on the opening degree so that the flow ratio control is performed even in case of flow deficiency in the controlled divided flow passage.

FIG. 7 shows a divided flow rate control by each switching-type controller 16a to 16d of each of the divided flow passages $L_1$ to $L_4$ in the divided flow rate control mode after the divided flow passage with the highest flow ratio (divided flow ratio) is designated for the fixed opening degree of 75%, and when a flow rate updating command is input to each of the switching-type controllers 16a to 16d from the flow ratio setting calculator RSC (S16), each of the switching-type controllers 16a to 16d firstly drives each of the electrically-operated cam type valves 28 at a fixed speed respectively (S17) and it is determined whether the detected flow rate is falling within a range of the flow rate command value plus or minus 1SCCM (S17a). In case the detected flow rate is falling within the range of the flow rate command value plus or minus 1SCCM, so-called PID feedback control is initiated (S18). In other words, each of the electrically-operated cam type valves 28 is operated for matching the flow rate command value from the flow ratio setting calculator RSC and the detected flow rate of each of the divided flow passages $L_1$ to $L_4$.

By the way, FIG. 7 (b) is a descriptive view showing the drive of each of the electrically-operated cam type valves 28 at the fixed speed, and switching levels over/under a target flow rate value (plus or minus 1SCCM in FIG. 7 (a)) are set and the opening degree of each of the electrically-operated cam type valves 28 is controlled by driving the valve at the fixed speed until the detected flow rate reaches the switching levels before switching to PID control so that responsiveness of divided flow rate control is enhanced. Here, the switching levels that are the target value plus or minus 1SCCM may be changed appropriately.

Figure 8:
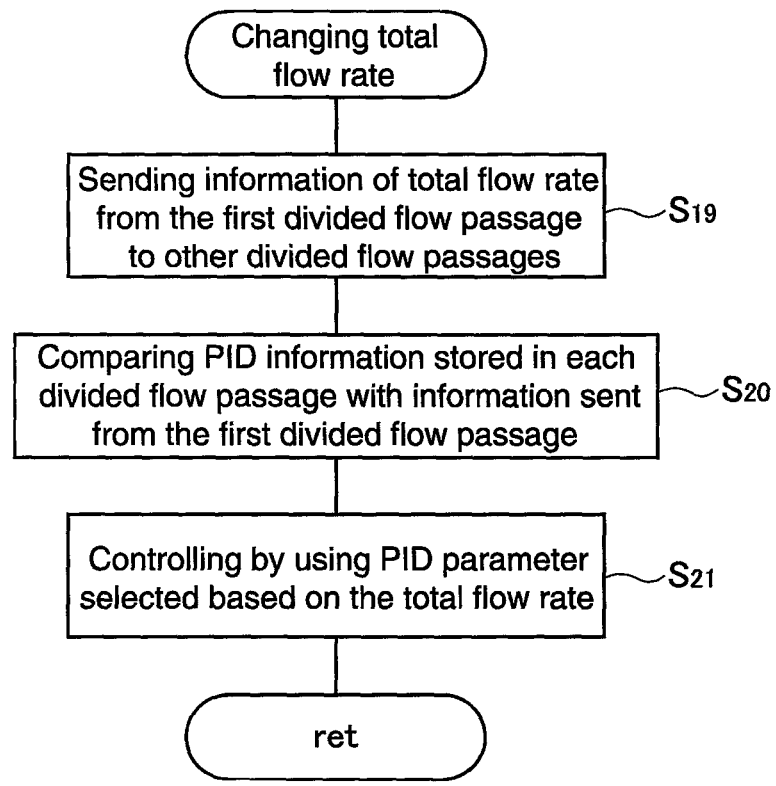
FIG. 8 is a descriptive view showing a case when a PID control parameter in each of the divided flow rate controlling portions is changed.

FIG. 8 is a descriptive view showing control of the PID parameter in the PID feedback control. In the present invention, information of a relation between a predetermined flow rate and a PID parameter of when the control is most suitably conducted is stored in a memory of each of the switching-type controllers 16a to 16d of each divided flow passage, and information of the total flow rate Q and the divided flow rates $Q_1$ to $Q_4$ is input to each switching-type controller 16a to 16d of each of the divided flow passages $L_1$ to $L_4$ from the flow ratio setting calculator RSC (S19), and the information of the total flow rate Q as well as the divided flow rates $Q_1$ to $Q_4$ and the PID parameter that is stored in the memory of each of the switching-type controllers 16a to 16d are compared with each other (S20), then a PID parameter that fits the total flow rate etc. is selected and PID feedback control is conducted with using this PID parameter (S21).

Figure 9:
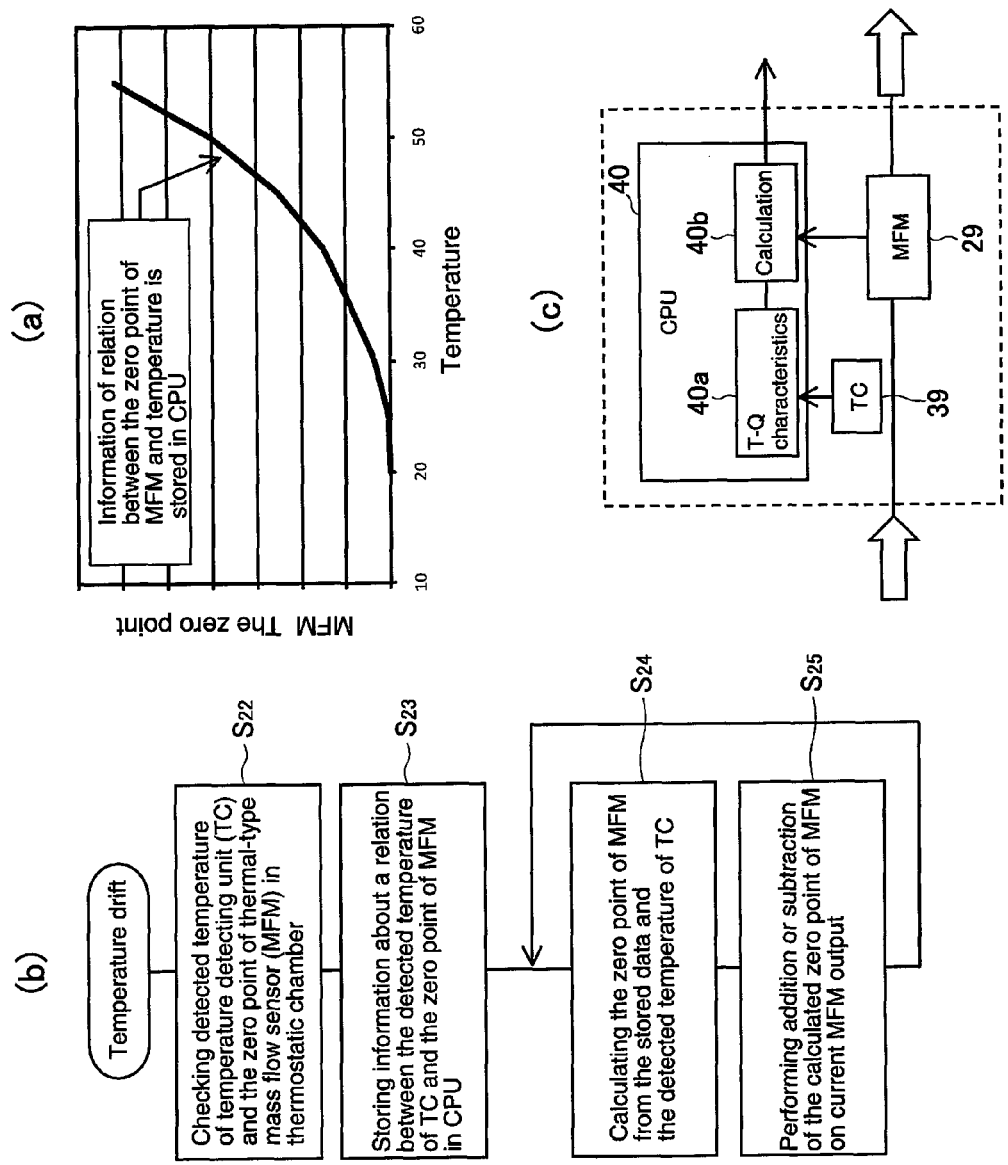
FIG. 9 is a descriptive view showing measures for zero-point temperature drift of a thermal-type mass flow sensor, which is used in the present invention and (a) shows a relation between the zero-point and temperature, (b) shows a processing flow of the measures for temperature drift and (c) shows a configuration of a processing mechanism for temperature drift.

When the zero point is adjusted in room temperature for the thermal-type mass flow sensor 29, the zero point is proved to shift as environmental temperature changes. FIG. 9 (a) shows a relation between the zero point of the conventional thermal-type mass flow sensor and temperature. As shown in FIG. 9 (b), in the present invention, the relation between detected temperature and the zero point is previously checked (S22), and information of the relation is stored in a CPU (S23), then the zero point of the thermal-type mass flow sensor 29 in actual detected temperature is calculated from the stored information (S24), and then temperature drift of the thermal-type mass flow sensor 29 is corrected by performing addition or subtraction of the detected zero point on an flow rate output of the thermal-type mass flow sensor 29 under the detected temperature (S25) for avoiding influence of the variation of the zero point (temperature drift).

FIG. 9 (c) shows a configuration of a processing mechanism for conducting the processing of FIG. 9 (b), and a temperature detecting portion 39 is disposed on an upstream side of the thermal-type mass flow sensor 29, and a storage portion 40a for storing information of temperature and characteristics of the zero point and a flow rate calculating portion 40b are provided to the CPU 40.

The thermal-type mass flow sensor 29 has relatively strong, so-called, pressure-dependence that influences both calibration of the thermal-type mass flow sensor and correction of measured value of a flow rate.

Figure 10:
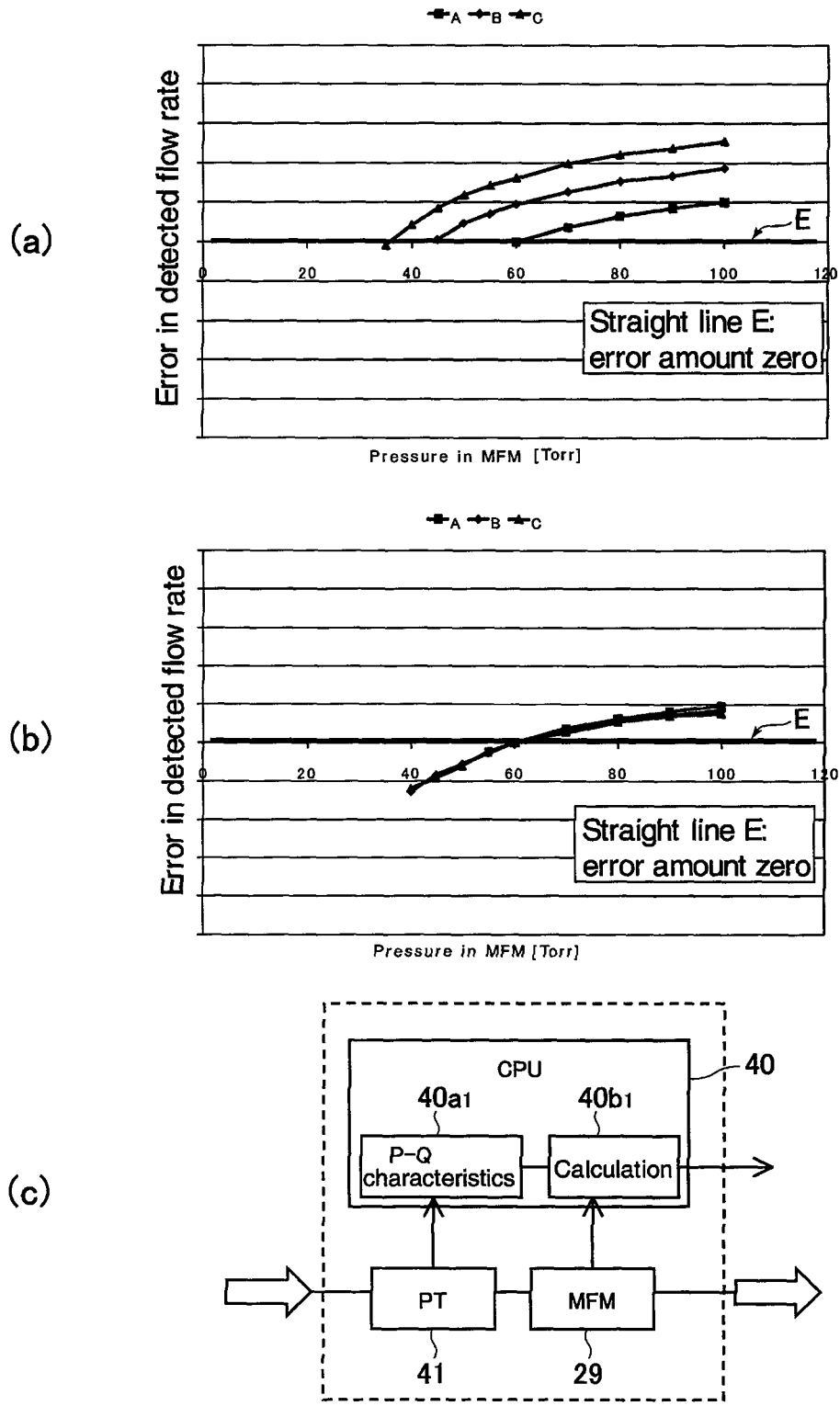
FIG. 10 is a descriptive view showing measures for pressure-dependence of the thermal-type mass flow sensor, which is used in the present invention, and (a) shows a relation between pressure in a flow rate regulating layer and error in a detected flow rate of each of the three individual thermal-type mass flow sensors, (b) shows a relation between pressure in the flow rate regulating layer and error in a detected flow rate of each of the three individual thermal-type mass flow sensors after taking the measures for pressure-dependence and (c) shows a configuration of a mechanism of the measures for pressure-dependence.

FIG. 10 (a) shows a relation between pressure (Torr) in the flow regulating layer portion and error in the detected flow rate of each of the three thermal-type mass flow sensors 29 when the same amount of gas is supplied to those three thermal-type mass flow sensors, and it can be seen that there is a different pressure value for each sensor that makes the amount of error in the detected flow rate zero. Straight line E shows error amount of zero.

In other words, amount of error in a flow rate detected in the thermal-type mass flow sensors 29 varies with a pressure condition in the flow regulating layer portion of the thermal-type mass flow sensor. Therefore, in the present invention, flow rate calibration is conducted always under the same pressure condition so that the amount of error in the flow rate detected by the thermal-type mass flow sensor 29 does not vary with each of the thermal-type mass flow sensors significantly even under decompression environment as shown in FIG. 10 (b).

Further, in the present invention, a relation between the flow rate detected by the thermal-type mass flow sensor 29 and the pressure in the thermal-type mass flow sensor is previously checked and the obtained information is stored in the CPU, and also the pressure in the flow regulating layer portion of the thermal-type mass flow sensor is monitored. Then, amount of error in the detected flow rate is calculated based on the information of the pressure in the flow regulating layer portion as well as the information of the relation between the detected flow rate and the pressure in the flow regulating layer portion that is stored in the CPU. After that, an error in the actual detected flow rate is adjusted so that the error amount becomes zero by performing addition or subtraction of the calculated error amount on the detected flow rate.

FIG. 10 (c) shows a configuration of a correction mechanism for correcting the detected flow rate value, which is based on the same idea as the case in FIG. 9 (c), and reference symbol 40 designates the CPU, reference symbol $40a_1$ designates the storage portion for storing information of pressure-flow rate error relation, and reference symbol $40b_1$ designates a calculator of flow rate.

Figure 11:
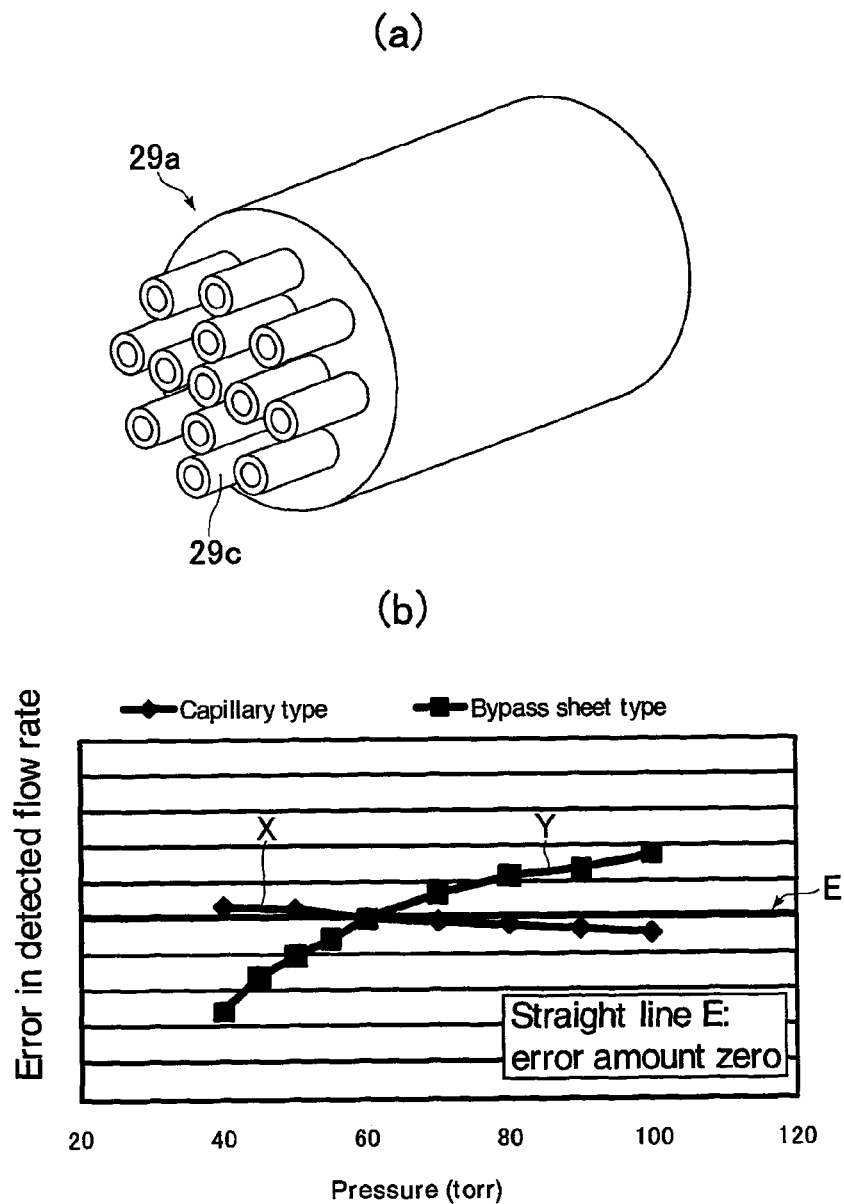
FIG. 11 (a) is a perspective view of an example of the flow regulating layer portion in the thermal-type mass flow sensor for lowering pressure-dependence of the thermal-type mass flow sensor and (b) shows pressure-dependence characteristics X of the flow regulating layer portion in the thermal-type mass flow sensor shown in (a).
Figure 12:
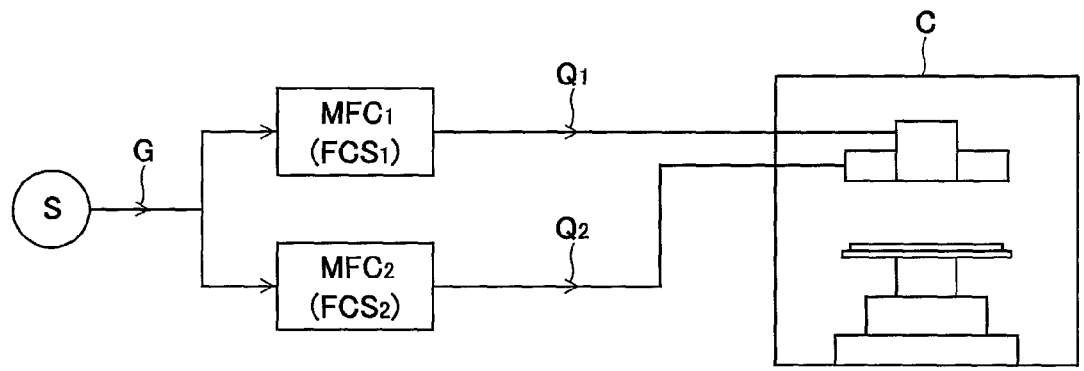
FIG. 12 is a system diagram of an example of a conventional gas dividing/supplying apparatus.
Figure 13:
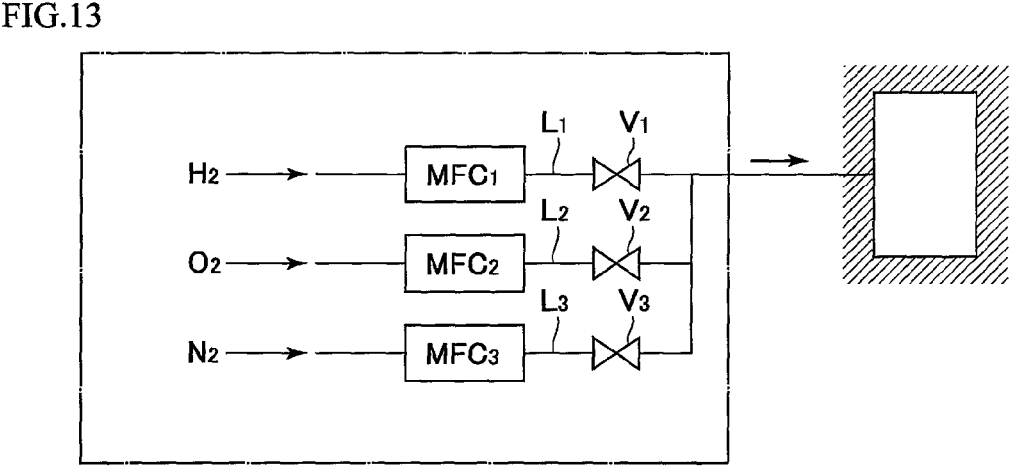
FIG. 13 is a system diagram of an example of the gas dividing/supplying apparatus that uses a conventional thermal-type flow rate control device (mass flow controller).
Figure 14:
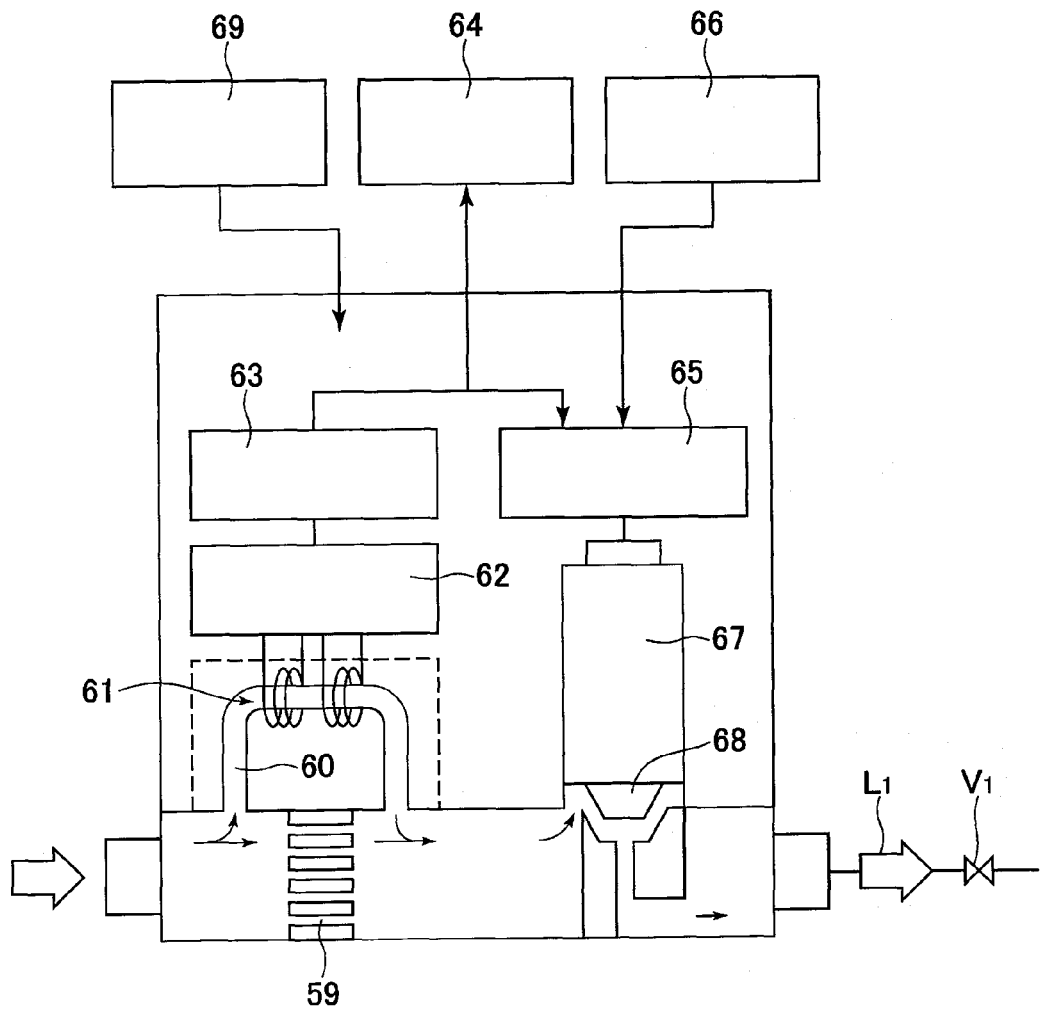
FIG. 14 is a descriptive view showing a configuration of the thermal-type flow rate control device.
Figure 15:
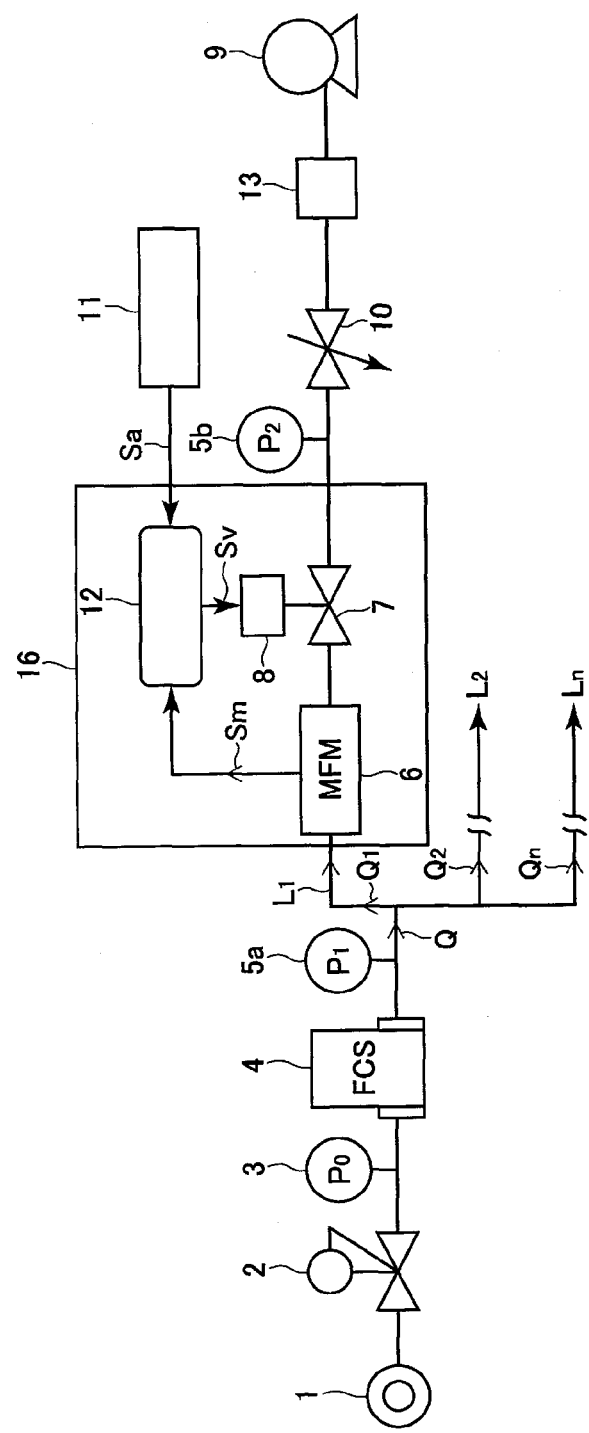
FIG. 15 is a descriptive view showing an example of the gas dividing/supplying apparatus with a flow rate regulator that uses a conventional PID controller.

By the way, the present inventors created a flow regulating layer portion 29a with a configuration wherein a plurality of small tubes 29c are arranged in parallel as shown in FIG. 11 (a), and examined a relation between an error in a flow rate detected by the thermal-type mass flow sensor 29 and pressure in the thermal-type mass flow sensor by use of the flow regulating layer portion.

FIG. 11 (b) shows a result of the examination, and a curb X shows a case of the flow regulating layer portion using the small tubes 29c (laminar flow component) shown in FIG. 11 (a) and a curb Y shows a case of a conventional bypass sheet-type flow regulating layer portion (laminar flow component). Straight line E shows error amount of zero.

The capillary-type flow regulating layer portion with the small tubes is capable of significantly lowering pressure-dependence of the error in the flow rate detected by the thermal-type mass flow sensor as clearly shown by the curb X.

INDUSTRIAL APPLICABILITY

The present invention is widely applicable not only to a gas dividing/supplying apparatus for use in a semiconductor manufacturing equipment but also, for example, to a gas supply equipment for use in chemical products manufacturing equipment in case this manufacturing equipment is the one that uses a flow rate control system for controlling a total flow rate.

DESCRIPTION OF REFERENCE SYMBOLS

Q Total flow rate
$Q_1$, $Q_n$ Divided flow rate
$L_1$, $L_n$ Divided flow passage
Ss Divided flow rate control command signal
Sp Opening control command signal
Sm Flow rate detecting signal
Sa Flow rate setting signal
$Sa_1$ to $Sa_4$ Flow rate setting signal
Sv Valve driving signal
$Sv_1$ to $Sv_4$ Valve driving signal
Sk Valve opening degree control signal
$Sk_1$ to $Sk_4$ Valve opening degree control signal
Sx Control switching signal
1 Gas supply source
2 Pressure regulator
3 Pressure sensor
4 Pressure-type flow rate control device (FCS)
5a, 5b Pressure gauges
6 Thermal-type mass flow sensor
7 Electrically-operated valve
8 Valve driving portion
9 Vacuum pump
10, 10a Throttle valves
11 Signal emitter
12 PID controller
13 Process chamber
14 Vacuum pump
15 Large-sized reactor
16 Flow rate regulator
16a to 16d Switching-type controller
17 Valve opening degree command signal emitter
18 Divided flow rate control command signal emitter
19 Control switching mechanism
20 Valve opening degree control mechanism
21 Divided flow rate control mechanism
22 Terminal
23 Terminal
24 Terminal
OD Outer device
RSC Flow ratio setting calculator
$U_1$ to $U_4$ Divided flow rate controlling portion
25 Base body
25a Gas passage
25b Thermal-type mass flow sensor insertion hole
25c Valve body insertion hole
26 Inlet-side block
26a Gas inlet
26b Gas passage
27 Outlet-side block
27a Gas outlet
27b Gas passage
28 Electrically-operated cam type valve
28a Valve body
28b Valve sheet
28c Diaphragm valve element
28d Valve element holder
28e Linear bushing
28f Stem
28g Bearing
29 Thermal-type mass flow sensor
29a Flow regulating layer portion
29b Flow rate detecting portion
29c Small tube
30 Control circuit board
31 Fixing screw
32 Casing
33 Cam board
34 Stepping pulse motor
34a Motor axis
35 Stroke regulating screw
36 Stroke regulating screw
37 Valve component of an electrically-operated cam type valve
38 Valve driving portion of an electrically-operated cam type valve
39 Temperature detecting portion
40 CPU
41 Pressure detecting portion
42 PID parameter regulating mechanism
43 Amplifier

The invention claimed is:

1. An apparatus for dividing and supplying gas, the apparatus comprising:
a flow rate control device that controls gas from a gas supply source;
a plurality of divided flow passages that are connected in parallel with each other, wherein gas flowing from the flow rate control device is divided and supplied to a location where the gas is used via the plurality of divided flow passages;
a plurality of thermal-type mass flow sensors, wherein a thermal-type mass flow sensor is disposed to each of the plurality of divided flow passages, respectively;
a plurality of electrically-operated valves, wherein an electrically-operated valve is disposed on a downstream side of each of the plurality of thermal-type mass flow sensors, respectively;
a plurality of controllers, wherein a controller is operably connected to control the opening and the closing of each of the plurality of electrically-operated valves, respectively; and
a flow ratio setting calculator, wherein the flow ratio setting calculator receives a flow ratio command that is input from outside and calculates a total flow rate based on flow rates of the plurality of thermal-type mass flow sensors, then calculates flow rates of the plurality of divided flow passages based on the calculated total flow rate as well as the flow ratio command, and then inputs the calculated flow rates as set flow rates to each of the plurality of controllers, respectively;
wherein, a first divided flow passage, comprising one of the plurality of divided flow passages with a highest set flow rate, is maintained in an uncontrolled state with a fixed valve opening degree, wherein the highest set flow rate is entered by the flow ratio setting calculator, wherein each of the rest of the plurality of divided passages is controlled by driving the corresponding electrically-operated valve at a fixed speed until a detected flow rate reaches a switching level to feedback control, and wherein the feedback control of the divided flow rate of each of the rest of the plurality of the divided flow passages is implemented by each of the controllers.

2. The apparatus for dividing and supplying gas according to claim 1,
wherein the fixed valve opening degree is maintained at 75%.

3. The apparatus for dividing and supplying gas according to claim 1,
wherein, when the divided flow rates of each of the rest of the plurality of the divided flow passages are subject to feedback control by the opening degrees of the electrically-operated valves being regulated based on flow rate detecting signals emitted from the plurality of thermal-type mass flow sensors via the plurality of controllers, PID control parameters are adjusted based on the total flow rate of gas flowing from the flow rate control device.

4. The apparatus for dividing and supplying gas according to claim 1,
wherein the plurality of electrically-operated valves are pulse motor-operated cam drive type valves having valve elements and valve sheets, wherein the valve elements are diaphragms made of stainless steel and the valve sheets are made of elastic resin, and wherein the valve sheets have an elasticity that, when the plurality of electrically-operated valves are fully-closed, creates a contact pressure between each of the valve elements and valve sheets.

5. The apparatus for dividing and supplying gas according to claim 1,
wherein the flow rate control device is a pressure-type flow rate control device, wherein each of the plurality of controllers has a valve opening degree control mode and a divided flow rate control mode, and wherein the plurality of controllers are switchable between the valve opening degree control mode and the divided flow rate control mode.

6. The apparatus for dividing and supplying gas according to claim 1,
wherein the number of the plurality of divided flow passages falls within a range of two to four, and wherein the valve opening degrees of the plurality of electrically-operated valves during the valve opening degree control is set between 40% and 80% of the opening degree of the valve that is fully opened.

7. The apparatus for dividing and supplying gas according to claim 1,
wherein the plurality of thermal-type mass flow sensors correct zero-point temperature drifts using stored information of relation between each temperature of the plurality of thermal-type mass flow sensors and each zero-point temperature, wherein each zero-point temperature is stored in the controllers beforehand.

8. The apparatus for dividing and supplying gas according to claim 1,
wherein the plurality of thermal-type mass flow sensors correct errors in detected flow rates using stored information of relation between each detected flow rate of the plurality of thermal-type mass flow sensors and each pressure in flow rate detecting portions, wherein each pressure in flow rate detecting portions is stored in the controllers beforehand.

9. The apparatus for dividing and supplying gas according to claim 1,
wherein each of the thermal-type mass flow sensors includes a flow regulating layer portion, comprising of a plurality of pipes that are coordinated in parallel, thereby reducing a difference between the detected flow rate and a flow rate of supplied gas flow by reducing pressure drop in the flow regulating layer portion.

10. A method for dividing and supplying gas by use of the gas dividing and supplying apparatus, the method comprising the steps of,
providing a flow rate control device that controls gas from a gas supply source, wherein the flow rate control device comprises a plurality of the divided flow passages that are connected in parallel with each other, wherein gas flowing from the flow rate control device is divided and supplied to a location where the gas is used via the plurality of divided flow passages, a plurality of the thermal-type mass flow sensors disposed to each of the plurality of divided flow passages, respectively, a plurality of electrically -operated valves disposed on a downstream side of each of the plurality of thermal-type mass flow sensors, respectively, a plurality of controllers operably connected to control the opening and the closing of each of the plurality of electrically-operated valves, respectively, and a flow ratio setting calculator receiving a flow ratio command input from outside and calculating a total flow rate based on flow rates of the plurality of thermal-type mass flow sensors, then calculates flow rates of the plurality of divided flow passages based on the calculated total flow rate as well as the flow ratio command, and then inputs the calculated flow rates as set flow rates to each of the plurality of controllers;
inputting the flow ratio setting calculator from outside;
supplying gas from the gas supply source, wherein the gass is supplied from the flow rate control device to each of the plurality of divided flow passages;
calculating the total flow rate in the flow ratio setting calculator based on the flow rates detected by the plurality of thermal-type mass flow sensors, then calculating flow rates that each of the plurality of divided flow passages requires from the calculated total flow rate and the flow ratio command, and then inputting the calculated flow rates as set flow rates to each of the controllers, respectively;
distinguishing a first divided flow passage, comprising one of the plurality of divided flow passages with a highest set flow rate, and putting then the distinguished first divided flow passage in an uncontrolled state by maintaining a fixed valve opening degree; and
adjusting the flow ratio by controlling the opening degrees of the remaining plurality of divided flow passages by driving the corresponding electrically-operated valve at a fixed speed until a detected flow rate reaches a switching level to feedback control, and after that, implementing the feedback control of the flow rate of each of the divided flow passages by the controllers, respectively.

* * * * *